United States Patent
Karampatsis et al.

(10) Patent No.: US 9,826,389 B2
(45) Date of Patent: Nov. 21, 2017

(54) METHOD AND APPARATUS FOR PERFORMING A SELECTIVE IP TRAFFIC OFFLOAD PROCEDURE

(75) Inventors: Dimitrios Karampatsis, Reading (GB); Kamel M. Shaheen, King of Prussia, PA (US); Milan Patel, Middlesex (GB)

(73) Assignee: InterDigital Patent Holdings, Inc., Wilmington, DE (US)

( * ) Notice: Subject to any disclaimer, the term of this patent is extended or adjusted under 35 U.S.C. 154(b) by 657 days.

(21) Appl. No.: 13/433,979

(22) Filed: Mar. 29, 2012

(65) Prior Publication Data
US 2012/0257598 A1 Oct. 11, 2012

Related U.S. Application Data

(60) Provisional application No. 61/471,022, filed on Apr. 1, 2011, provisional application No. 61/501,108, filed
(Continued)

(51) Int. Cl.
*H04W 8/08* (2009.01)
*H04W 36/00* (2009.01)
(Continued)

(52) U.S. Cl.
CPC ........ *H04W 8/082* (2013.01); *H04W 36/0033* (2013.01); *H04W 76/04* (2013.01); *H04W 84/045* (2013.01)

(58) Field of Classification Search
CPC ... H04W 8/802; H04W 84/045; H04W 80/04; H04W 76/041; H04L 29/12735;
(Continued)

(56) References Cited

U.S. PATENT DOCUMENTS 6,415,151 B1 7/2002 Kreppel
7,647,416 B2 1/2010 Chiang et al.
(Continued)

FOREIGN PATENT DOCUMENTS

GB 2 472 866 2/2011
JP 2003-.37689 A2 2/2003
WO 2011/021815 A2 2/2011

OTHER PUBLICATIONS

Interdigital Communications, "SIPTO@LN for UE in ECM-Connected mode," 3GPP TSG SA WG2 Meeting #85, TD S2-112565 (May 16-20, 2011).
(Continued)

*Primary Examiner* — Ian N Moore
*Assistant Examiner* — Brian T Le
(74) *Attorney, Agent, or Firm* — Volpe and Koenig, P.C.

(57) ABSTRACT

A method and apparatus are described for performing a selected Internet protocol (IP) traffic offload (SIPTO) procedure. A network node, (e.g., a mobility management entity (MME) or a serving general packet radio service (GPRS) support node (SGSN)), may receive a packet data network (PDN) connectivity request from a wireless transmit/receive unit (WTRU). A determination may be made to perform SIPTO at a local network, and the WTRU may perform a PDN release and reconnection procedure. The determination may be based on at least one of a closed subscriber group (CSG) identity (ID), a home evolved Node-B (HeNB) ID or a local network ID. An access network discovery and selection function (ANDSF) may be queried for IP interface selection (OPIIS) rules, a local access point name (APN) that supports per flow SIPTO at a local network, and IP flows that may be routed to the local APN.

14 Claims, 23 Drawing Sheets

Related U.S. Application Data on Jun. 24, 2011, provisional application No. 61/563,026, filed on Nov. 22, 2011.

(51) Int. Cl.
  *H04W 76/04* (2009.01)
  *H04W 84/04* (2009.01)

(58) Field of Classification Search
  CPC . H04L 61/3075; H04L 47/10; H04L 61/2514; H04L 45/22; H04L 29/12367; H04L 12/4633
  See application file for complete search history.

(56) References Cited

U.S. PATENT DOCUMENTS

| | | | |
|---|---|---|---|
| 8,144,661 | B2 | 3/2012 | Sundell et al. |
| 9,271,228 | B2 | 2/2016 | Ulupinar et al. |
| 9,295,089 | B2 | 3/2016 | Chitrapu et al. |
| 9,473,986 | B2 | 10/2016 | Tomici et al. |
| 2010/0034083 | A1 | 2/2010 | Prakash et al. |
| 2010/0302958 | A1 | 12/2010 | Wieffeldt et al. |
| 2011/0171953 | A1* | 7/2011 | Faccin et al. ............. 455/426.1 |
| 2011/0286410 | A1 | 11/2011 | Zembutsu et al. |
| 2012/0023189 | A1* | 1/2012 | Giaretta et al. .............. 709/217 |
| 2012/0039304 | A1* | 2/2012 | Kim ...................... H04W 28/08 370/332 |
| 2014/0161026 | A1* | 6/2014 | Stojanovski et al. ......... 370/328 |

OTHER PUBLICATIONS

Interdigital Communications, "SIPTO@LN when UE is in ECM-Idle mode," 3GPP TSG SA WG2 Meeting #85, TD S2-112564 (May 16-20, 2011).

LG Electronics, "On solutions for SIPTO for the H(e)NB subsystem," 3GPP TSG SA WG2 Meeting #85, TD S2-112442 (May 16-20, 2011).

Roh et al., "Femtocell Traffic Offload Scheme for Core Networks," IEEE International Conference on New Technologies, Mobility, and Security, pp. 1-5 (Feb. 2011).

Third Generation Partnership Project, "Technical Specification Group Services and System Aspects; Architecture enhancements for non-3GPP accesses (Release 9)," 3GPP TS 23.402 V9.8.0 (Mar. 2011).

Third Generation Partnership Project, "Technical Specification Group Services and System Aspects; Architecture enhancements for non-3GPP accesses (Release 10)," 3GPP TS 23.402 V10.3.0 (Mar. 2011).

Third Generation Partnership Project, "Technical Specification Group Services and System Aspects; Architecture enhancements for non-3GPP accesses (Release 8)," 3GPP TS 23.402 V8.9.0 (Jun. 2010).

Third Generation Partnership Project, "Technical Specification Group Services and System Aspects; General Packet Radio Service (GPRS) enhancements for Evolved Universal Terrestrial Radio Access Network (E-UTRAN) access (Release 8)," 3GPP TS.401 V8.13.0 (Mar. 2011).

Third Generation Partnership Project, "Technical Specification Group Services and System Aspects; General Packet Radio Service (GPRS) enhancements for Evolved Universal Terrestrial Radio Access Network (E-UTRAN) access (Release 9)," 3GPP TS 23.401 V9.8.0 (Mar. 2011).

Third Generation Partnership Project, "Technical Specification Group Services and System Aspects; General Packet Radio Service (GPRS) enhancemengts for Evolved Universal Terrestrial Radio Access Network (E-UTRAN) access (Release 10)," 3GPP TS 23.401 V10.3.0 (Mar. 2011).

Third Generation Partnership Project, "Technical Specification Group Services and System Aspects; Operator Policies for IP Interface Selection (OPIIS); (Release 11)," 3GPP TR 23.853 V0.3.1 (Aug. 2011).

Third Generation Partnership Project, "Technical Specification Group Services and System Aspects; LIPA Mobility and SIPTO at the Local Network; (Release 11)," 3GPP TR 23.859 V0.1.1 (Feb. 2011).

Third Generation Partnership Project, "Technical Specification Group Services and System Aspects; LIPA Mobility and SIPTO at the Local Network; (Release 11)," 3GPP TR 23.859 V0.4.0 (Jul. 2011).

Third Generation Partnership Project, "Technical Specification Group Services and System Aspects; Local IP Access and Selected IP Traffice Offload (LIPA-SIPTO) (Release 10)," 3GPP TR 23.829 V10.0.1 (Oct. 2011).

Third Generation Partnership Project, "Technical Specification Group Services and System Aspects; Local IP Access and Selected IP Traffic Offload (LIPA-SIPTO) (Release 10)," 3GPP TR 23.829 V10.0.0 (Mar. 2011).

Third Generation Partnership Project, "Technical Specification Group Services and System Aspects; General Packet Radio Service (GPRS) enhancements for Evolved Universal Terrestrial Radio Access Network (E-UTRAN) access (Release 11)," 3GPP TS 23.401 V11.1.0 (Mar. 2012).

Third Generation Partnership Project, "Technical Specification Group Services and System Aspects; General Packet Radio Service (GPRS) enhancements for Evolved Universal Terrestrial Radio Access Network (E-UTRAN) access (Release 8)," 3GPP TS 23.401 V8.16.0 (Mar. 2012).

Third Generation Partnership Project, "Technical Specification Group Services and System Aspects; General Packet Radio Service (GPRS) enhancements for Evolved Universal Terrestrial Radio Access Network (E-UTRAN) access (Release 9)," 3GPP TS 23.401 V9.12.0 (Mar. 2012).

Third Generation Partnership Project, "Technical Specification Group Services and System Aspects; General Packet Radio Service (GPRS) enhancements for Evolved Universal Terrestrial Radio Access Network (E-UTRAN) access (Release 10)," 3GPP TS 23.401 V10.7.0 (Mar. 2012).

Third Generation Partnership Project, "Technical Specification Group Services and System Aspects; 3GPP System Architecture Evolution (SAE); Security aspects of non-3GPP accesses (Release 10)," 3GPP TS 33.402 V10.3.0 (Mar. 2012).

Third Generation Partnership Project, "Technical Specification Group Services and System Aspects; 3GPP System Architecture Evolution (SAE); Security aspects of non-3GPP accesses (Release 9)," 3GPP TS 33.402 V9.6.0 (Dec. 2012).

Third Generation Partnership Project, "Technical Specification Group Services and System Aspects; 3GPP System Architecture Evolution (SAE); Security aspects of non-3GPP accesses (Release 9)," 3GPP TS 33.402 V9.7.0 (Mar. 2012).

Third Generation Partnership Project, "Technical Specification Group Services and System Aspects; 3GPP System Architecture Evolution (SAE); Security aspects of non-3GPP accesses (Release 10)," 3GPP TS 33.402 V10.0.0 (Dec. 2010).

Third Generation Partnership Project, "Technical Specification Group Services and System Aspects; 3GPP System Architecture Evolution (SAE); Security aspects of non-3GPP accesses; (Release 8)," 3GPP TS 33.402 V8.6.0 (Dec. 2009).

Third Generation Partnership Project, "Technical Specification Group Services and System Aspects; 3GPP System Architecture Evolution (SAE); Security aspects of non-3GPP accesses (Release 8)," 3GPP TS 33.402 V8.7.0 (Mar. 2012).

Third Generation Partnership Project, "Technical Specification Group Services and System Aspects; 3GPP System Architecture Evolution (SAE); Security aspects of non-3GPP accesses (Release 11)," 3GPP TS 33.402 V11.3.1 (Mar. 2012).

Third Generation Partnership Project, "Technical Specification Group Services and System Aspects; Architecture enhancements for non-3GPP accesses (Release 8)," 3GPP TS 23.402 V8.10.0 (Mar. 2012).

Third Generation Partnership Project, "Technical Specification Group Services and System Aspects; Architecture enhancements for non-3GPP accesses (Release 10)," 3GPP TS 23.402 V10.7.0 (Mar. 2012).

(56) References Cited

OTHER PUBLICATIONS

Third Generation Partnership Project, "Technical Specification Group Services and System Aspects; General Packet Radio Service (GPRS); Service description; Stage 2 (Release 4)," 3GPP TS 23.060 V4.11.0 (Dec. 2006).
Third Generation Partnership Project, "Technical Specification Group Services and System Aspects; General Packet Radio Service (GPRS); Service description; Stage 2 (Release 11)," 3GPP TS 23.060 V11.1.0 (Mar. 2012).
Third Generation Partnership Project, "Technical Specification Group Services and System Aspects; Architecture enhancements for non-3GPP accesses (Release 11)," 3GPP TS 23.402 V11.2.0 (Mar. 2012).
Third Generation Partnership Project, "Technical Specification Group Services and System Aspects; Architecture enhancements for non-3GPP accesses (Release 9)," 3GPP TS 23.402 V9.12.0 (Mar. 2012).
Third Generation Partnership Project, "Technical Specification Group Services and System Aspects; General Packet Radio Service (GPRS); Service description; Stage 2 (Release 5)," 3GPP TS 23.060 V5.13.0 (Dec. 2006).
Third Generation Partnership Project, "Technical Specification Group Services and System Aspects; General Packet Radio Service (GPRS); Service description; Stage 2 (Release 6)," 3GPP TS 23.060 V6.15.0 (Dec. 2006).
Third Generation Partnership Project, "Technical Specification Group Services and System Aspects; General Packet Radio Service (GPRS); Service description; Stage 2 (Release 8)," 3GPP TS 23.060 V8.15.0 (Mar. 2012).
Third Generation Partnership Project, "Technical Specification Group Services and System Aspects; General Packet Radio Service (GPRS); Service description; Stage 2 (Release 7)," 3GPP TS 23.060 V7.10.0 (Sep. 2010).
Third Generation Partnership Project, "Technical Specification Group Services and System Aspects; General Packet Radio Service (GPRS); Service description; Stage 2 (Release 7)," 3GPP TS 23.060 V8.12.0 (Mar. 2011).
Third Generation Partnership Project, "Technical Specification Group Services and System Aspects; General Packet Radio Service (GPRS); Service description; Stage 2 (Release 7)," 3GPP TS 23.060 V7.11.0 (Jun. 2011).
Third Generation Partnership Project, "Technical Specification Group Services and System Aspects; General Packet Radio Service (GPRS); Service description; Stage 2 (Release 9)," 3GPP TS 23.060 V9.8.0 (Mar. 2011).
Third Generation Partnership Project, "Technical Specification Group Services and System Aspects; General Packet Radio Service (GPRS); Service description; Stage 2 (Release 9)," 3GPP TS 23.060 V9.12.0 (Mar. 2012).
Third Generation Partnership Project, "Technical Specification Group Services and System Aspects; General Packet Radio Service (GPRS); Service description; Stage 2 (Release 1999)," 3GPP TS 23.060 V3.17.0 (Dec. 2006).
Third Generation Partnership Project, "Technical Specification Group Services and System Aspects; General Packet Radio Service (GPRS); Service description; Stage 2 (Release 10)," 3GPP TS 23.060 V10.7.0 (Mar. 2012).
Third Generation Partnership Project, "Technical Specification Group Services and System Aspects; General Packet Radio Service (GPRS); Service description; Stage 2 (Release 10)," 3GPP TS 23.060 V10.3.0 (Mar. 2011).
Third Generation Partnership Project, "Technical Specification Group Services and System Aspects; Service requirements for Home Node B (HNB) and Home eNode B (HeNB) (Release 10)," 3GPP TS 22.220 V10.5.1 (Feb. 2011).
Third Generation Partnership Project, "Technical Specification Group Core Network and Terminals; Access Network Discovery and Selection Function (ANDSF) Management Object (MO) (Release 9),0" 3GPP TS 24.312 V9.1.0 (Mar. 2010).
Third Generation Partnership Project, "Technical Specification Group Services and System Aspects; Service requirements for Home Node B (HNB) and Home eNode B (HeNB) (Release 11)," 3GPP TS 22.220 V11.4.0 (Dec. 2011).
Third Generation Partnership Project, "Technical Specification Group Services and System Aspects; Service requirements for Home Node B (HNB) and Home eNode B (HeNB) (Release 11)," 3GPP TS 22.220 V11.0.0 (Jan. 2010).
Third Generation Partnership Project, "Technical Specification Group Core Network and Terminals; Access Network Discovery and Selection Function (ANDSF) Management Object (MO) (Release 8)," 3GPP TS 24.312 V8.5.0 (Mar. 2010).
Third Generation Partnership Project, "Technical Specification Group Core Network and Terminals; Access Network Discovery and Selection Function (ANDSF) Management Object (MO) (Release 10)," 3GPP TS 24.312 V10.5.0 (Mar. 2012).
Third Generation Partnership Project, "Technical Specification Group Services and System Aspects; Service requirements for Home Node B (HNB) and Home eNode B (HeNB) (Release 9)," 3GPP TS 22.220 V9.8.0 (Dec. 2011).
Third Generation Partnership Project, "Technical Specification Group Services and System Aspects Service aspects; Service principles (Release 4)," 3GPP TS 22.101 4.10.0 (Mar. 2004).
Third Generation Partnership Project, "Technical Specification Group Core Network and Terminals; Access Network Discovery and Selection Function (ANDSF) Management Object (MO) (Release 10)," 3GPP TS 24.312 V10.1.0 (Dec. 2010).
Third Generation Partnership Project, "Technical Specification Group Core Network and Terminals; Access Network Discovery and Selection Function (ANDSF) Management Object (MO) (Release 9)," 3GPP TS 24.312 V9.2.0 (Sep. 2011).
Third Generation Partnership Project, "Technical Specification Group Core Network and Terminals; Access Network Discovery and Selection Function (ANDSF) Management Object (MO) (Release 11)," 3GPP TS 24.312 V11.2.0 (Mar. 2012).
Third Generation Partnership Project, "Technical Specification Group Services and System Aspects Service aspects; Service principles (Release 1999)," 3GPP TS 22.101 V 3.17.0 (Mar. 2004).
Third Generation Partnership Project, "Technical Specification Group Services and System Aspects; Service requirements for Home Node B (HNB) and Home eNode B (HeNB) (Release 9)," 3GPP TS 22.220 V9.5.0 (Sep. 2010).
Third Generation Partnership Project, "Technical Specification Group Services and System Aspects; Service requirements for Home Node B (HNB) and Home eNode B (HeNB) (Release 10)," 3GPP TS 22.220 V10.8.0 Dec. 2011).
Third Generation Partnership Project, "Technical Specification Group Services and System Aspects; Service aspects; Service principles (Release 9)," 3GPP TS 22.101 V9.8.0 (Sep. 2010).
Third Generation Partnership Project, "Technical Specification Group Services and System Aspects Service aspects; Service principles (Release 8)," 3GPP TS 22.101 8.14.0 (Dec. 2009).
Third Generation Partnership Project, "Technical Specification Group Services and System Aspects Service aspects; Service principles (Release 7)," 3GPP TS 22.101 7.12.0 (Mar. 2009).
Third Generation Partnership Project, "Technical Specification Group Services and System Aspects Service Aspects; Service principles (Release 6)," 3GPP TS 22.101 6.12.0 (Jun. 2007).
Third Generation Partnership Project, "Technical Specification Group Services and System Aspects; Service aspects; Service principles (Release 5)," 3GPP TS 22.101 5.14.0 (Jun. 2007).
Third Generation Partnership Project, "Technical Specification Group Services and System Aspects; Service aspects; Service principles (Release 9)," 3GPP TS 22.101 V9.9.0 (Jun. 2011).
Third Generation Partnership Project, "Technical Specification Group Services and System Aspects; Service aspects; Service principles (Release 10)," 3GPP TS 22.101 V10.7.0 (Sep. 2011).
Third Generation Partnership Project, "Technical Specification Group Services and System Aspects; Service aspects; Service principles (Release 11)," 3GPP TS 22.101 V11.0.0 (Sep. 2010).
Third Generation Partnership Project, "Technical Specification Group Services and System Aspects; Service aspects; Service principles (Release 10)," 3GPP TS 22.101 V10.5.1 (Feb. 2011).

(56) References Cited

OTHER PUBLICATIONS

Third Generation Partnership Project, "Technical Specification Group Services and System Aspects; Service Aspects; Service principles (Release 11)," 3GPP TS 22.101 V11.5.0 (Mar. 2012).
Catt et al., "User interaction for SIPTO for H(e)NB subsystem," 3GPP TSG SA WG2 Meeting #82, S2-105707, Jacksonville, Florida, USA (Nov. 15-19, 2010).
China Mobile et al., "Efficient SIPTO GW re-selection," 3GPP TSG SA WG2 Meeting #81, S2-105260, Prague, Czech Republic (Oct. 11-15, 2010).
Ericsson et al., "Clarify SIPTO reconnection," 3GPP TSG SA WG2 Meeting #83, S2-111162, Salt Lake City, Utah, USA (Feb. 21-25, 2011).
LG Electronics et al., "Wid for Operator Policies for IP Interface Selection (OPIIS)," 3GPP TSG SA WG2 Meeting #83, S2-111275, Salt Lake City, Utah, USA (Feb. 21-25, 2011).
Third Generation Partnership Project, "Technical Specification Group Services and System Aspects; Local IP Access and Selected IP Traffic Offload (Release 10)," 3GPP 23.829 V1.1.0 (May 2010). (see in particular pp. 1-4, 7-9, and 33-38).
ZTE, "Mobility Issue for LIPA_SIPTO," 3GPP TSG SA WG2 Meeting #75, S2-095311, Kyoto, Japan (Aug. 31-Sep. 4, 2009).
ZTE, "SIPTO at H(e)NB solution1—using LIPA to offload traffic," 3GPP TSG SA WG2 Meeting #83, S2-110511, Salt Lake City, Utah, USA (Feb. 21-25, 2011).
ZTE, "SIPTO at H(e)Nb solution2—using O-GW to offload traffic," 3GPP TSG SA WG2 Meeting #83, S2-110512, Salt Lake City, Utah, USA (Feb. 21-25, 2011).
Catt et al., "PDN connection redirection in SIPTO scenario," 3GPP TSG-CT WG1 Meeting #66, C1-103558, Xi'an (P.R. China) (Aug. 23-27, 2010 ).
Interdigital Communications et al., "SIPTO@LN scenarios," 3GPP TSG SA WG2 Meeting #86, S2-113621, Naantali, Finland (Jul. 11-15, 2011).
Third Generation Partnership Project, "Technical Specification Group Services and System Aspects; Policy and charging control architecture (Release 7)," 3GPP TS 23.203 V7.12.0 (Dec. 2009).
Third Generation Partnership Project, "Technical Specification Group Services and System Aspects; Policy and charging control architecture (Release 7)," 3GPP TS 23.203 V7.13.0 (Mar. 2012).
Third Generation Partnership Project, "Technical Specification Group Services and System Aspects; Policy and charging control architecture (Release 8)," 3GPP TS 23.203 V8.11.0 (Sep. 2010).
Third Generation Partnership Project, "Technical Specification Group Services and System Aspects; Policy and charging control architecture (Release 8)," 3GPP TS 23.203 V8.13.0 (Mar. 2012).
Third Generation Partnership Project, "Technical Specification Group Services and System Aspects; Policy and charging control architecture (Release 9)," 3GPP TS 23.203 V9.8.0 (Mar. 2011).
Third Generation Partnership Project, "Technical Specification Group Services and System Aspects; Policy and charging control architecture (Release 9)," 3GPP TS 23.203 V9.11.0 (Mar. 2012).
Third Generation Partnership Project, "Technical Specification Group Services and System Aspects; Policy and charging control architecture (Release 10)," 3GPP TS 23.203 V10.3.0 (Mar. 2011).
Third Generation Partnership Project, "Technical Specification Group Services and System Aspects; Policy and charging control architecture (Release 10)," 3GPP TS 23.203 V10.6.0 (Mar. 2012).
Third Generation Partnership Project, "Technical Specification Group Services and System Aspects; Policy and charging control architecture (Release 11)," 3GPP TS 23.203 V11.1.0 (Mar. 2011).
Third Generation Partnership Project, "Technical Specification Group Services and System Aspects; Policy and charging control architecture (Release 11)," 3GPP TS 23.203 V11.5.0 (Mar. 2012).
Third Generation Partnership Project, "Technical Specification Group Services and System Aspects; IP flow mobility and seamless Wireless Local Area Network (WLAN) offload; Stage 2 (Release 10)," 3GPP TS 23.261 V10.1.0 (Sep. 2010).
Third Generation Partnership Project, "Technical Specification Group Services and System Aspects; IP flow mobility and seamless Wireless Local Area Network (WLAN) offload; Stage 2 (Release 10)," 3GPP TS 23.261 V10.2.0 (Mar. 2012).
Third Generation Partnership Project, "Technical Specification Group Services and System Aspects; Multi access PDN connectivity and IP flow mobility (Release 9)," 3GPP TR 23.861 V1.3.0 (Sep. 2009).
Third Generation Partnership Project, "Technical Specification Group Services and System Aspects; Study on Policy solutions and enhancements (Release 11)," 3GPP TR 23.813 V11.0.0 (Jun. 2011).
Third Generation Partnership Project, "Technical Specification Group Services and System Aspects; Study on Policy solutions and enhancements (Release 10)," 3GPP TR 23.813 V0.5.0 (Feb. 2011).
Third Generation Partnership Project, "Technical Specification Group Core Network and Terminals; User Data Convergence (UDC); Technical realization and information flows; Stage 2 (Release 10)," 3GPP TS 23.335 V10.0.0 (Mar. 2011).
Third Generation Partnership Project, "Technical Specification Group Core Network and Terminals; User Data Convergence (UDC); Technical realization and information flows; Stage 2 (Release 9)," 3GPP TS 23.335 V9.3.0 (Dec. 2010).
Third Generation Partnership Project, "Technical Specification Group Core Network and Terminals; Access to the 3GPP Evolved Packet Core (EPC) via non-3GPP access networks; Stage 3 (Release 8)," 3GPP TS 24.302 V8.7.0 (Sep. 2010).
Third Generation Partnership Project, "Technical Specification Group Core Network and Terminals; Access to the 3GPP Evolved Packet Core (EPC) via non-3GPP access networks; Stage 3 (Release 8)," 3GPP TS 24.302 V8.10.0 (Sep. 2011).
Third Generation Partnership Project, "Technical Specification Group Core Network and Terminals; Access to the 3GPP Evolved Packet Core (EPC) via non-3GPP access networks; Stage 3 (Release 9)," 3GPP TS 24.302 V9.4.0 (Sep. 2010).
Third Generation Partnership Project, "Technical Specification Group Core Network and Terminals; Access to the 3GPP Evolved Packet Core (EPC) via non-3GPP access networks; Stage 3 (Release 9)," 3GPP TS 24.302 V9.7.0 (Sep. 2011).
Third Generation Partnership Project, "Technical Specification Group Core Network and Terminals; Access to the 3GPP Evolved Packet Core (EPC) via non-3GPP access networks; Stage 3 (Release 10)," 3GPP TS 24.302 V10.2.0 (Dec. 2010).
Third Generation Partnership Project, "Technical Specification Group Core Network and Terminals; Access to the 3GPP Evolved Packet Core (EPC) via non-3GPP access networks; Stage 3 (Release 10)," 3GPP TS 24.302 V10.7.0 (Mar. 2012).
Third Generation Partnership Project, "Technical Specification Group Core Network and Terminals; Access to the 3GPP Evolved Packet Core (EPC) via non-3GPP access networks; Stage 3 (Release 11)," 3GPP TS 24.302 V11.2.0 (Mar. 2012).

* cited by examiner

METHOD AND APPARATUS FOR PERFORMING A SELECTIVE IP TRAFFIC OFFLOAD PROCEDURE

CROSS REFERENCE TO RELATED APPLICATIONS

This application claims the benefit of U.S. Provisional Application No. 61/471,022, filed on Apr. 1, 2011, U.S. Provisional Application No. 61/501,108, filed on Jun. 24, 2011, and U.S. Provisional Application No. 61/563,026, filed on Nov. 22, 2011, the contents of which are incorporated by reference herein.

BACKGROUND

Local Internet protocol (IP) access (LIPA) may allow communication between wireless transmit/receive units (WTRUs) belonging to the same local network, (e.g., residential network or enterprise network). A LIPA-enabled WTRU that is connected to a home evolved Node-B or a home Node-B (H(e)NB) that is part of a local network may access another LIPA-enabled WTRU that is attached to an H(e)NB that is part of the same local network.

Selected IP traffic offload (SIPTO) may allow offloading of selected traffic (e.g., the Internet) towards an IP network close to a WTRU's point of attachment to an access network. In one scenario, selected traffic may be offloaded between gateways within the operator's realm. In another scenario, for SIPTO at the local network (SIPTO@LN), selected traffic flows from a femtocell may be offloaded directly to the Internet, thus bypassing the operator's core network Operator policies for IP interface selection (OPISS) have been established for selecting an IP interface in a WTRU for routing IP flows among a choice of available interfaces in both third generation partnership (3GPP) and non-3GPP accesses. OPISS policies may be implemented by an access network discovery and selection function (ANDSF), which may assist a WTRU to discover non-3GPP access networks and govern the connection of 3GPP and non-3GPP networks.

SUMMARY

A method and apparatus are described for performing a selected Internet protocol (IP) traffic offload (SIPTO) procedure. A network node, (e.g., a mobility management entity (MME) or a serving general packet radio service (GPRS) support node (SGSN)), may receive a packet data network (PDN) connectivity request from a wireless transmit/receive unit (WTRU). A determination may be made to perform SIPTO at a local network, and the WTRU may perform a PDN release and reconnection procedure. The determination may be based on at least one of a closed subscriber group (CSG) identity (ID), a home evolved Node-B (HeNB) ID or a local network ID. An access network discovery and selection function (ANDSF) may be queried for IP interface selection (OPIIS) rules, a local access point name (APN) that supports per flow SIPTO at a local network, and IP flows that may be routed to the local APN.

BRIEF DESCRIPTION OF THE DRAWINGS

A more detailed understanding may be had from the following description, given by way of example in conjunction with the accompanying drawings wherein.

DETAILED DESCRIPTION

Figure 1A:
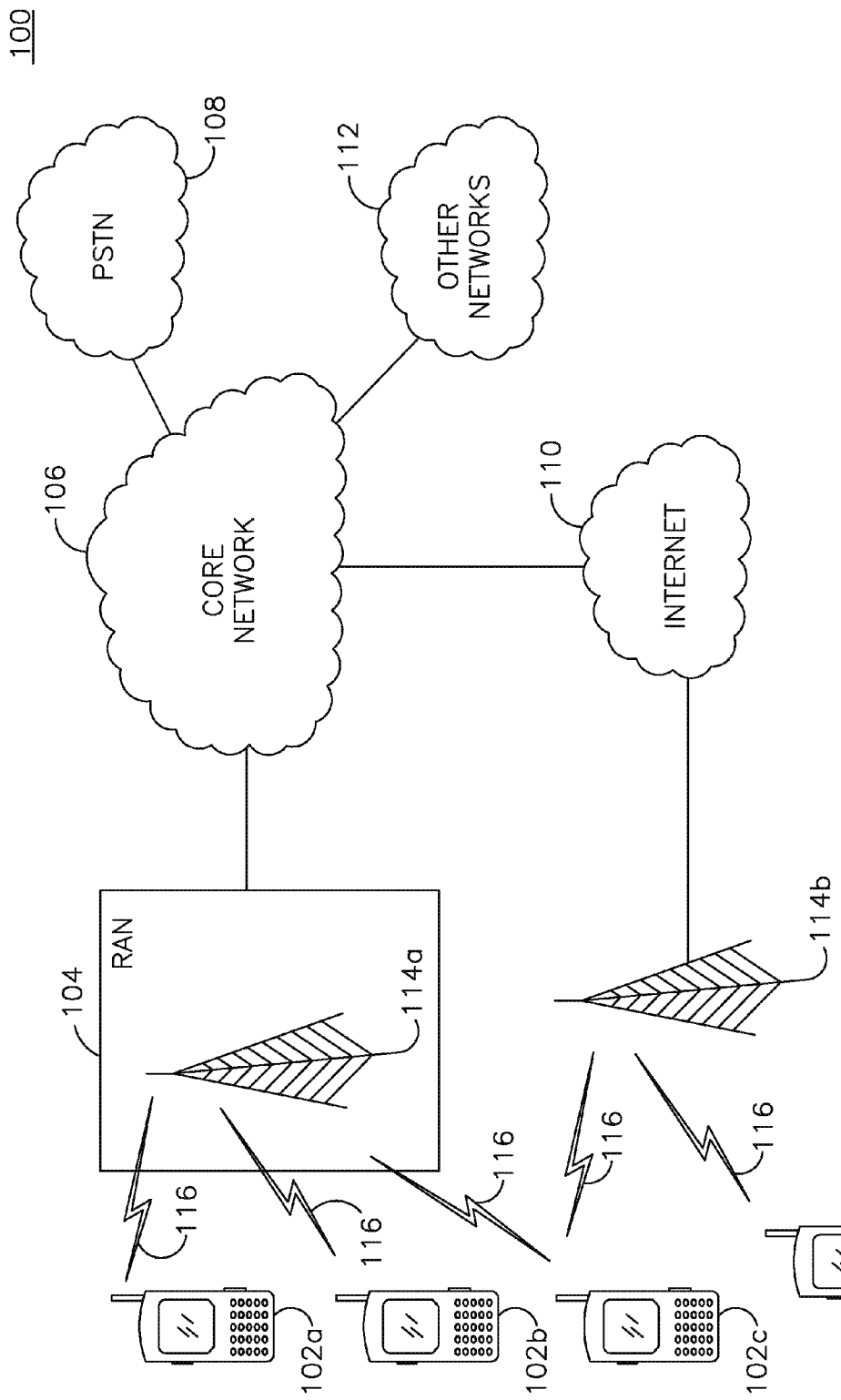
FIG. 1A shows an example communications system in which one or more disclosed embodiments may be implemented.

FIG. 1A shows an example communications system 100 in which one or more disclosed embodiments may be implemented. The communications system 100 may be a multiple access system that provides content, such as voice, data, video, messaging, broadcast, and the like, to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include WTRUs 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an evolved Node-B (eNB), a Home Node-B (HNB), a Home eNB (HeNB), a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link, (e.g., radio frequency (RF), microwave, infrared (IR), ultraviolet (UV), visible light, and the like). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as universal mobile telecommunications system (UMTS) terrestrial radio access (UTRA), which may establish the air interface 116 using wideband CDMA (WCDMA). WCDMA may include communication protocols such as high-speed packet access (HSPA) and/or evolved HSPA (HSPA+). HSPA may include high-speed downlink packet access (HSDPA) and/or high-speed uplink packet access (HSUPA).

In another embodiment, the base station 114a and the WTRUs 102a, 102b, 102c may implement a radio technology such as evolved UTRA (E-UTRA), which may establish the air interface 116 using long term evolution (LTE) and/or LTE-Advanced (LTE-A).

In other embodiments, the base station 114a and the WTRUs 102a, 102b, 102c may implement radio technologies such as IEEE 802.16 (i.e., worldwide interoperability for microwave access (WiMAX)), CDMA2000, CDMA2000 1X, CDMA2000 evolution-data optimized (EV-DO), Interim Standard 2000 (IS-2000), Interim Standard 95 (IS-95), Interim Standard 856 (IS-856), global system for mobile communications (GSM), enhanced data rates for GSM evolution (EDGE), GSM/EDGE RAN (GERAN), and the like.

The base station 114b in FIG. 1A may be a wireless router, HNB, HeNB, or AP, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT, (e.g., WCDMA, CDMA2000, GSM, LTE, LTE-A, and the like), to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over Internet protocol (VoIP) services to one or more of the WTRUs 102a, 102b, 102c, 102d. For example, the core network 106 may provide call control, billing services, mobile location-based services, pre-paid calling, Internet connectivity, video distribution, and the like, and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the Internet protocol (IP) in the TCP/IP suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
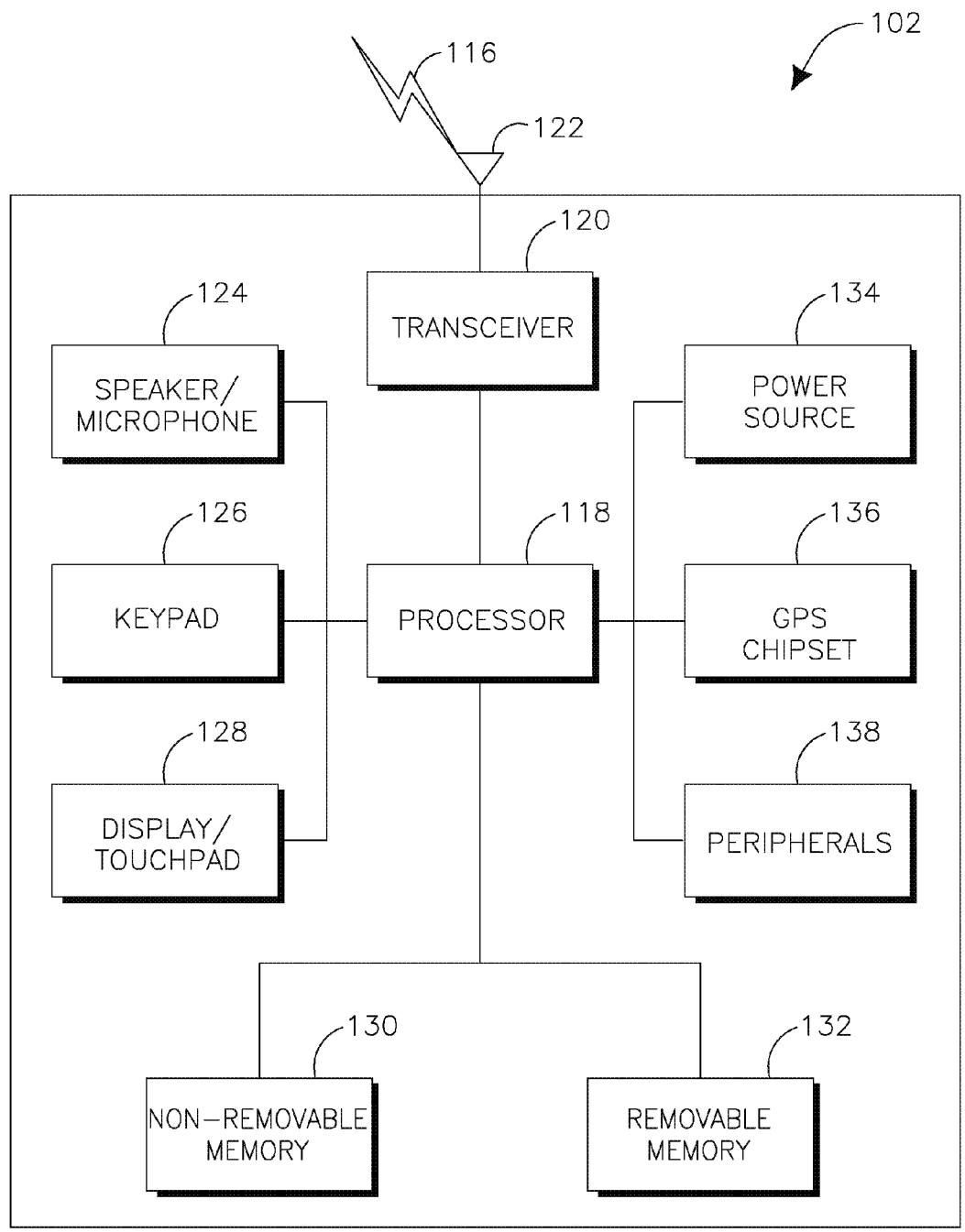
FIG. 1B shows an example wireless transmit/receive unit (WTRU) that may be used within the communications system shown in FIG. 1A.

FIG. 1B shows an example WTRU 102 that may be used within the communications system 100 shown in FIG. 1A. As shown in FIG. 1B, the WTRU 102 may include a processor 118, a transceiver 120, a transmit/receive element, (e.g., an antenna), 122, a speaker/microphone 124, a keypad 126, a display/touchpad 128, a non-removable memory 130, a removable memory 132, a power source 134, a global positioning system (GPS) chipset 136, and peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a microprocessor, one or more microprocessors in association with a DSP core, a controller, a microcontroller, an application specific integrated circuit (ASIC), a field programmable gate array (FPGA) circuit, an integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. The transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122, (e.g., multiple antennas), for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), and the like), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station, (e.g., base stations 114a, 114b), and/or determine its location based on the timing of the signals being received from two or more nearby base stations. The WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
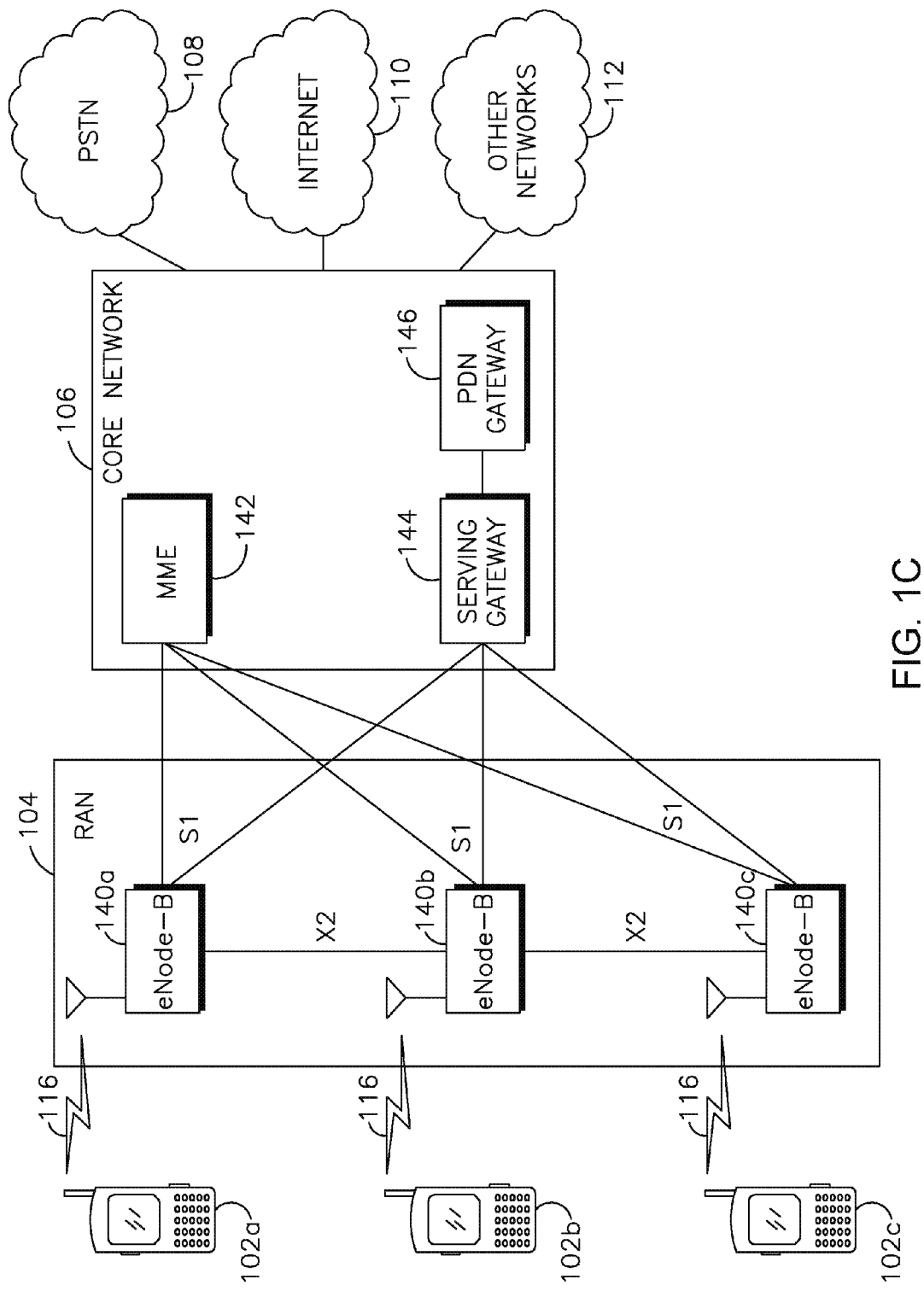
FIG. 1C shows an example radio access network and an example core network that may be used within the communications system shown in FIG. 1A.

FIG. 1C shows an example RAN 104 and an example core network 106 that may be used within the communications system 100 shown in FIG. 1A. As noted above, the RAN 104 may employ an E-UTRA radio technology to communicate with the WTRUs 102a, 102b, 102c over the air interface 116. The RAN 104 may also be in communication with the core network 106.

The RAN 104 may include eNBs 140a, 140b, 140c, though it will be appreciated that the RAN 104 may include any number of eNBs while remaining consistent with an embodiment. The eNBs 140a, 140b, 140c may each include one or more transceivers for communicating with the WTRUs 102a, 102b, 102c over the air interface 116. In one embodiment, the eNBs 140a, 140b, 140c may implement MIMO technology. Thus, the eNB 140a, for example, may use multiple antennas to transmit wireless signals to, and receive wireless signals from, the WTRU 102a.

Each of the eNBs 140a, 140b, 140c may be associated with a particular cell (not shown) and may be configured to handle radio resource management decisions, handover decisions, scheduling of users in the uplink and/or downlink, and the like. As shown in FIG. 1C, the eNBs 140a, 140b, 140c may communicate with one another over an X2 interface.

The core network 106 shown in FIG. 1C may include a mobility management entity (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNBs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNBs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNB handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway, (e.g., an IP multimedia subsystem (IMS) server), that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Figure 2:
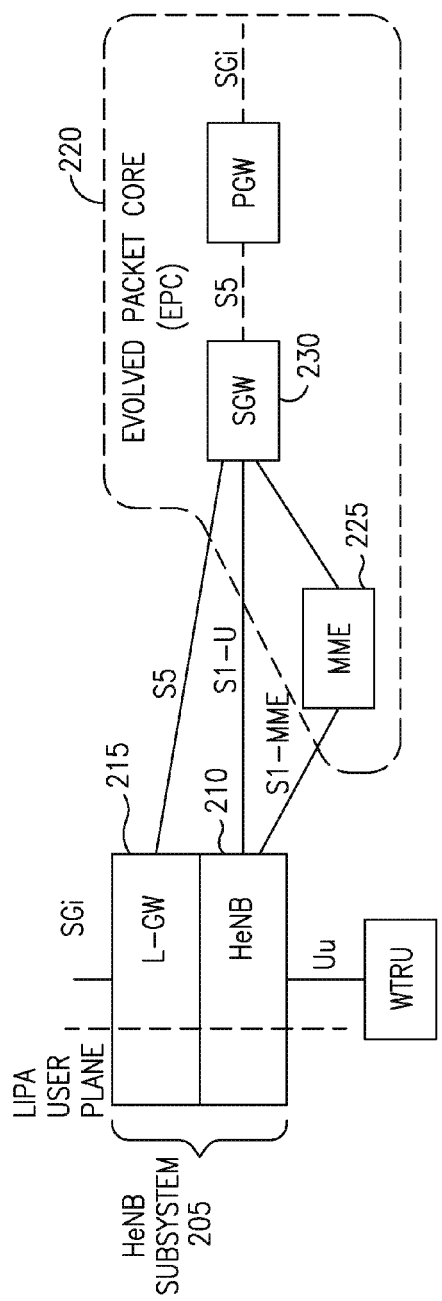
FIG. 2 shows an example of a local Internet protocol (IP) access (LIPA) architecture for a home evolved Node-B (HeNB) using a local packet data network (PDN) connection.

FIG. 2 shows an example of local Internet protocol (IP) access (LIPA) architecture 200 for a home evolved Node-B (HeNB) using a local packet data network (PDN) connection. The LIPA architecture 200 may include an HeNB subsystem 205 having an HeNB 210 and a local gateway (L-GW) 215. The HeNB subsystem 205 may further include an HeNB gateway (GW) (not shown). A LIPA access function may be achieved using the L-GW 215 collocated with the HeNB 210.

The HeNB subsystem 205 may be connected by a standard Si interface to an evolved packet core (EPC) 220. More specifically, the HeNB 210 may communicate with a mobility management entity (MME) 225 in the EPC 215 via an S1-MME interface, and the HeNB 210 communicates with a serving gateway (SGW) 230 in the EPC 215 via an S1-U interface. When LIPA is activated, the L-GW 215 communicates with the SGW 230 via an S5 interface.

If mobility is not supported for LIPA when a WTRU moves out of an H(e)NB coverage area, the LIPA session may be released (i.e., discontinued). LIPA may be supported for access point names (APNs) that are valid when the WTRU is connected to a specific closed subscriber group (CSG). LIPA may also be supported for "conditional" APNs that may be authorized for LIPA service when the WTRU is using a specific CSG. APNs marked as "LIPA prohibited" or without a LIPA permission indication may not be used for LIPA.

Figure 3:
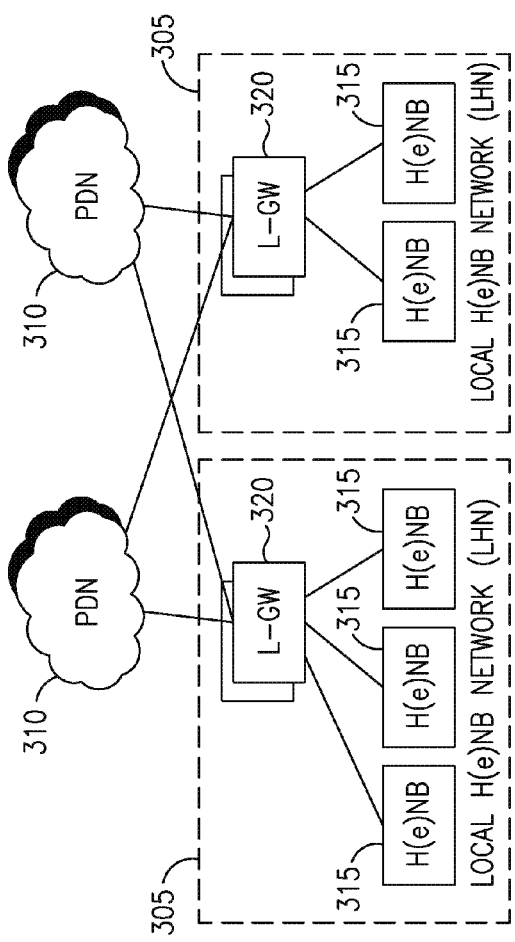
FIG. 3 shows an example of an architecture for LIPA mobility.

FIG. 3 shows an example of an architecture 300 for LIPA mobility including a plurality of local H(e)NB networks (LHNs) 305 connected to a plurality of local packet data networks (PDNs) 310. The H(e)NB may be part of an HeNB or HNB subsystem. Each of the LHNs includes a plurality of H(e)NBs 315 connected to an L-GW 320. Each of the H(e)NBs 315 may have IP connectivity for LIPA to either of the local PDNs 310 via the L-GWs 320. Thus, one of the local PDNs 310 may be accessed via multiple LHNs 305, and the H(e)NBs 315 of an LHN 305 may belong to different CSGs. LIPA mobility may be supported in each of the LHNs 305, where a WTRU may maintain session continuity when handing over between different H(e)NBs 315 that are part of the same LHN 305. If the WTRU moves out of the LHN 305 coverage, then the LIPA session may be released, (i.e., discontinued).

Figure 4:
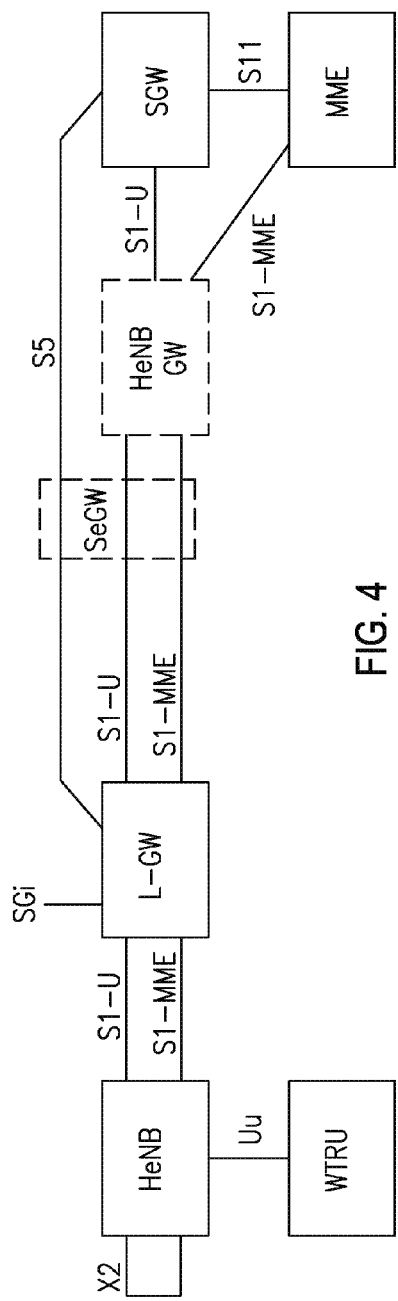
FIG. 4 shows a stand-alone local gateway (L-GW) located on an S1 path.

FIG. 4 shows a stand-alone local gateway (L-GW) located on an S1-U/S1-MME path. This architecture may fully reuse existing handover procedures defined for the inter-H(e)NB handover. Routing of the Iu/S1 connections through the L-GW may be enforced either via tunneling approaches between the H(e)NB and the L-GW, or through a local configuration.

Selected IP traffic offload (SIPTO) at the local network (or SIPTO@LN) may be performed without traversing the mobile operator network, subject to regulatory requirements. The mobile operator and the H(e)NB hosting party, within the limits set by the mobile operator, may enable/disable SIPTO@LN per H(e)NB or per LHNs. Based on mobile operator SIPTO@LN policies, the network may allow a user to accept/decline offload before the traffic is offloaded. The user's service experience may be different if the user's traffic is offloaded via SIPTO for H(e)NB subsystems. The SIPTO@LN policies may be defined per APN or per IP flow. SIPTO@LN policies per APN may indicate whether all traffic associated with a specific APN is subject to offload. SIPTO@LN policies per IP flow may be routing policies indicating which APN to use for a specific IP flow. An operator may provide routing policies to a WTRU that assist the WTRU in routing the IP flows towards an appropriate APN. The mobile operator may configure the SIPTO policies either statically or dynamically.

SIPTO, (or SIPTO above the RAN), may be initiated when a WTRU requests a PDN connection providing an APN where SIPTO is applicable. An MME may check whether SIPTO is subscribed for the WTRU, (e.g., based on the APN), and also may check the location of the WTRU. If a local PGW is near the WTRU, the MME may decide to offload part or all of the traffic to the local PGW. The MME may initiate SIPTO by deactivating the impacted PDN connections indicating "reactivation requested". If all of the PDN connections for the WTRU need to be relocated, the MME may initiate an "explicit detach with reattach required" procedure.

For the operator to allow/prohibit SIPTO on a per user and per APN basis, subscription data in a home subscriber server (HSS) may be configured to indicate, to the MME, whether offload is allowed or prohibited. If the SIPTO allowed/prohibited information from the HSS conflicts with the MME's configuration for that WTRU, then SIPTO is not used. Additionally, SIPTO may also be performed at the local network. Operator policies may also be determined for selecting an IP interface in the WTRU for routing of IP flows among a choice of available interfaces in both third generation partnership project (3GPP) and non-3GPP accesses.

A WTRU that is subscribed for SIPTO may attach to an H(e)NB subsystem. The network, based on the WTRU subscription, may perform SIPTO at the local network, thus offloading traffic from the macro-network to the L-GW in the femto (H(e)NB) network, thus avoiding signaling to go via the macro network and reducing congestion.

The SIPTO policies may be described per APN or per IP flow. SIPTO policies per APN indicate whether traffic associated with a specific APN is subject to offload. SIPTO policies per IP flow are routing policies indicating which APN to use for a specific IP flow. The operator may provide routing policies to the WTRU that assist the WTRU in routing the IP flows towards an appropriate APN. A method to perform SIPTO@LN is described in greater detail hereafter.

Figure 5:
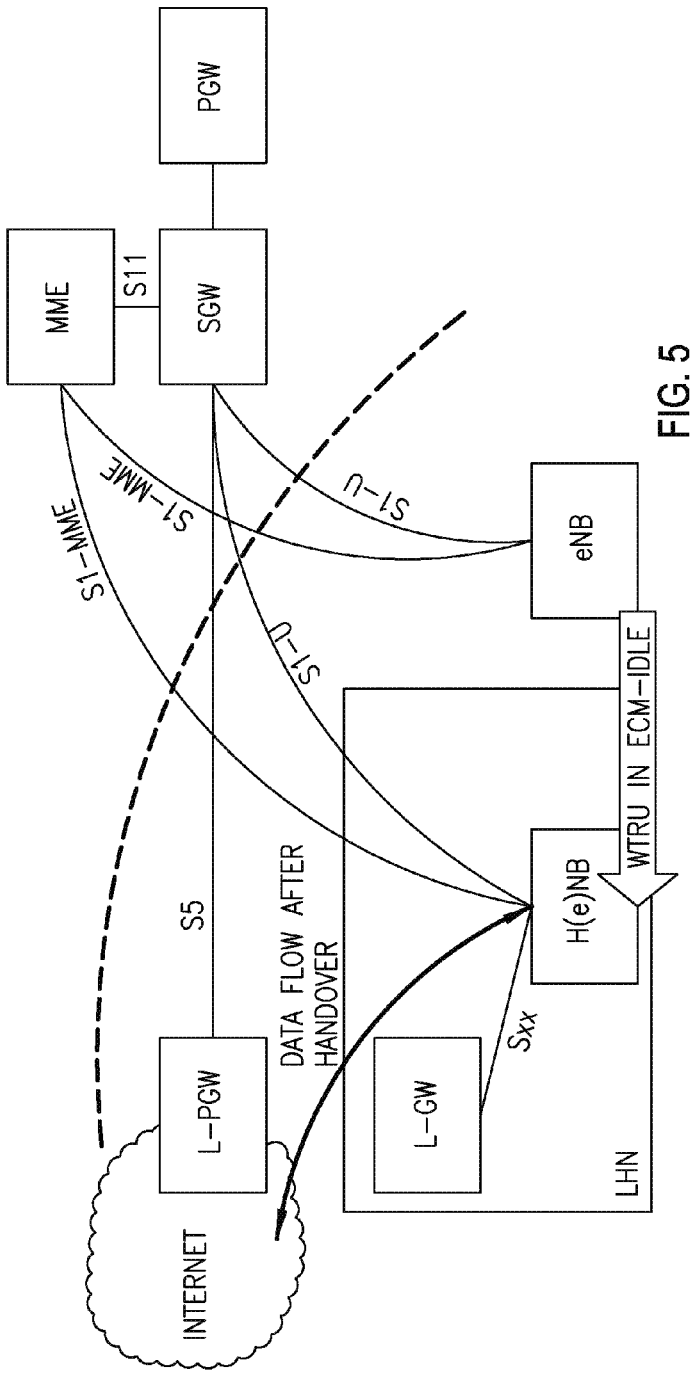
FIG. 5 shows an example of wireless transmit/receive unit (WTRU) mobility between macro to local network (WTRU in idle mode)
Figure 6:
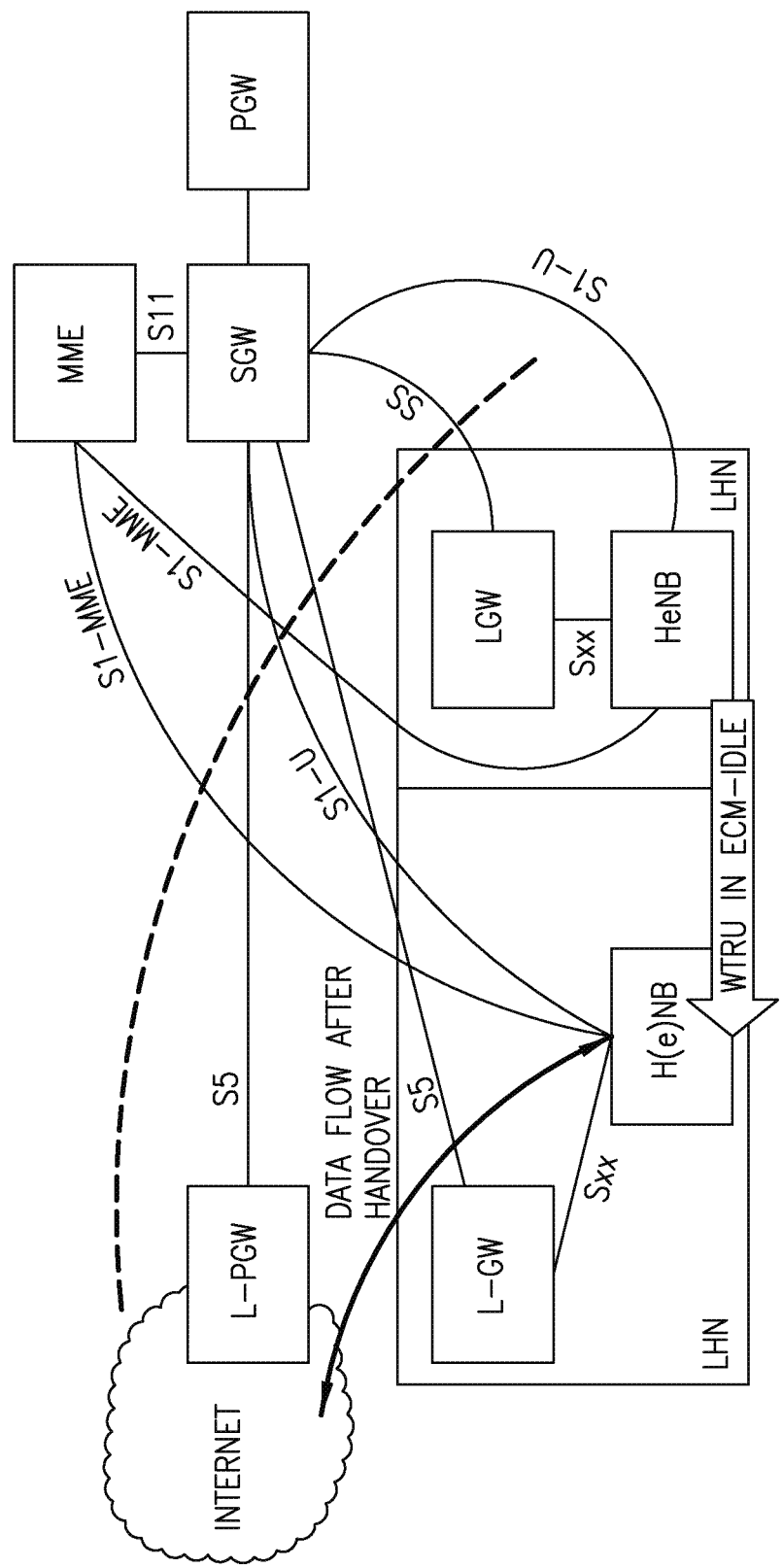
FIG. 6 shows an example of WTRU mobility between local H(e)NB networks (LHNs)
Figure 7:
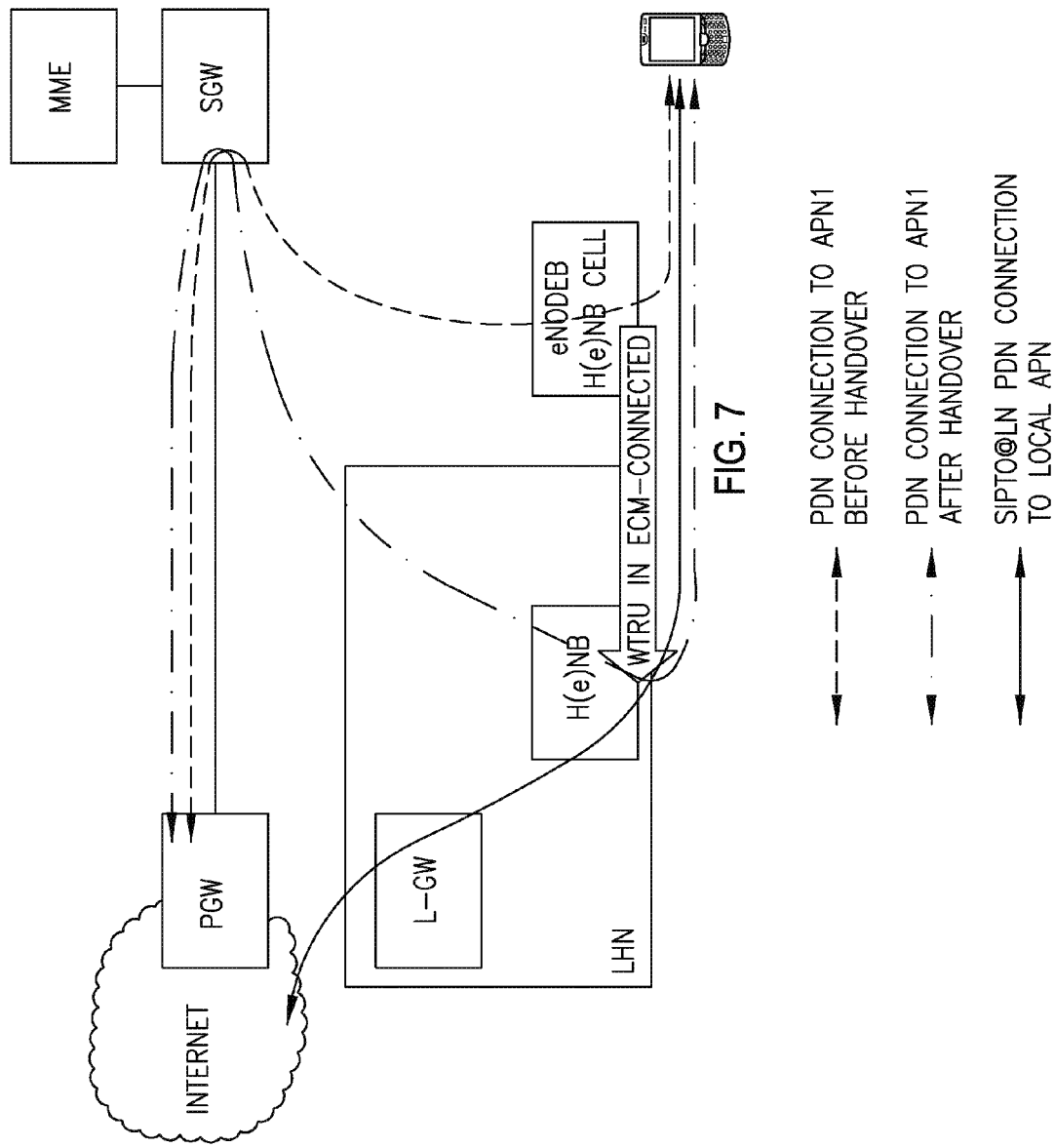
FIG. 7 shows an example of selected IP traffic offload at the local network (SIPTO@LN) when a WTRU handover occurs between an evolved Node-B (eNB) or H(e)NB and a local network.
Figure 8:
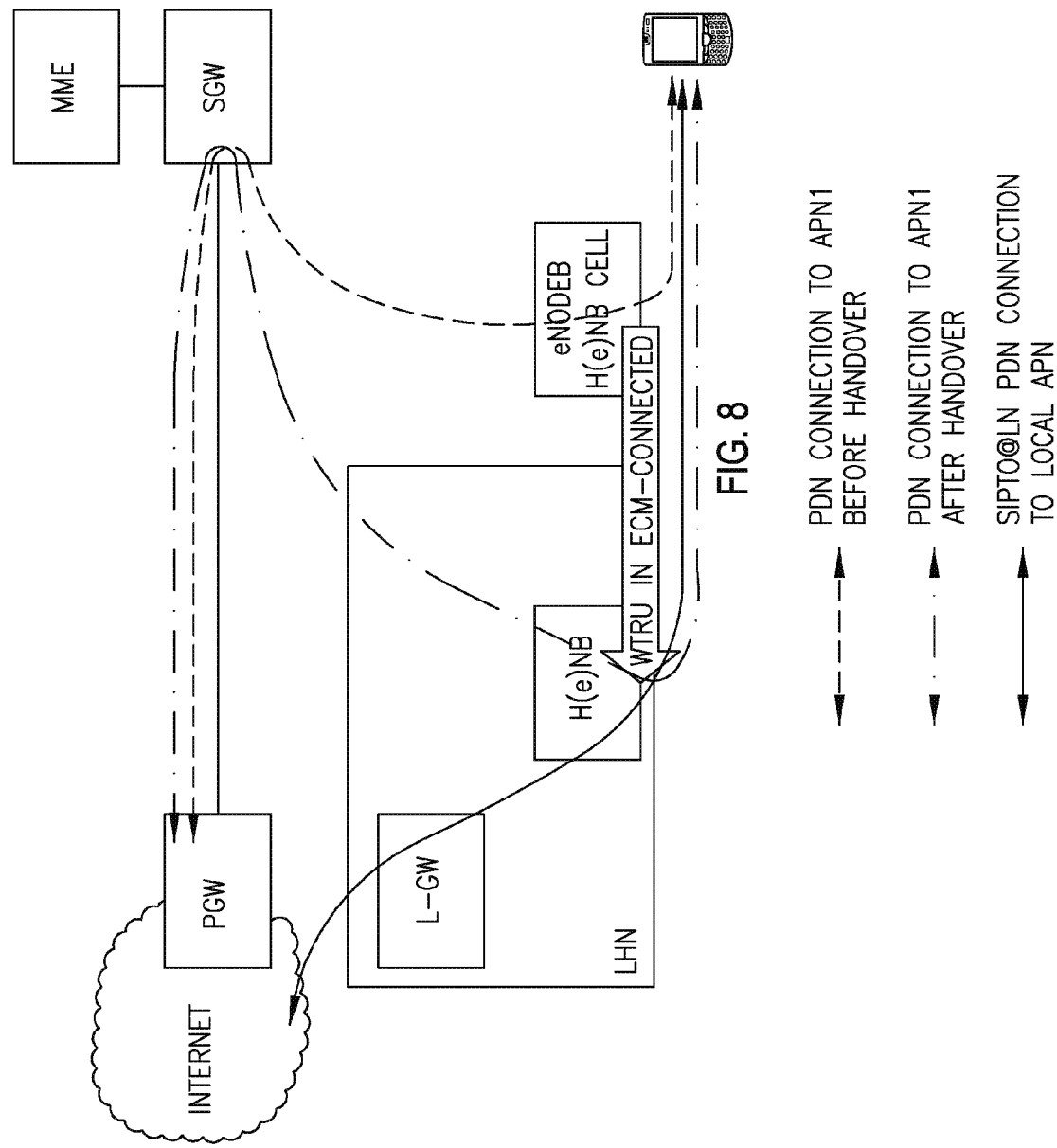
FIG. 8 shows an example of per flow SIPTO@LN (the WTRUs have simultaneous PDN connections to an L-GW and a PDN gateway (PGW))

FIGS. 5 and 6 show examples of procedures to perform SIPTO@LN, including the scenarios where the WTRU is idle. FIGS. 7 and 8 show examples of procedures to perform SIPTO@LN while connected to the network. Although the examples of FIGS. 5-8 are directed towards an evolved universal terrestrial radio access network (E-UTRAN) of a long term evolution (LTE) system, the same principles may apply to a UTRAN (universal mobile telecommunications system (UMTS)), where the MME is replaced by a serving general packet radio service (GPRS) support node (SGSN). The femtocell may support either HeNB or HNB femtocells. For simplicity, the term H(e)NB is used.

When the WTRU is in idle mode, two cases may apply. In a first case, the WTRU may be registered in an eNB cell and attaches in an H(e)NB of an LHN, as shown in FIG. 5. In a second case, the WTRU may be registered in an H(e)NB cell of a Local HeNB network and attaches in a neighbor H(e)NB cell, (of the same or different LHN). FIG. 6 shows the case where the WTRU registers to a different LHN.

When the WTRU is connected, (i.e., has an active PDN connection), the network may offload all traffic associated with an APN, (per APN offload), or provide routing policies indicating which APN to use for a specific IP flow, (per flow SIPTO@LN).

FIG. 7 shows an example SIPTO@LN when the WTRU handover occurs between an eNB or H(e)NB to a LHN. When the network performs per APN SIPTO@LN, two cases may apply (shown in FIG. 5). In a first case, the WTRU may be connected in an eNB cell and perform a handover in an H(e)NB. The H(e)NB is part of an LHN supporting an L-GW. In a second case, the WTRU may be connected in an H(e)NB cell and perform a handover to a neighbor H(e)NB cell. The target H(e)NB is part of an LHN supporting an L-GW. The source H(e)NB may be part of the same LHN or a different LHN.

FIG. 8 shows a per flow SIPTO@LN wherein the WTRU has simultaneous PDN connections to the L-GW and PGW. When the network carries out per flow SIPTO@LN, then the WTRU may have simultaneous PDN connections over the PDN-GW and over the L-GW as shown in FIG. 8.

In one scenario, a WTRU may be attached to an H(e)NB with no active PDN connection at an L-GW. The WTRU may have an active PDN connection via a 3GPP network. In another scenario, a WTRU may be attached to an H(e)NB and has PDN connections at an L-GW and a PGW. In yet another scenario, the WTRU may be registered to an LHN but has no active PDN connection. The WTRU may have an active PDN connection via the PGW.

If there is no local PDN connection active, (i.e., PDN connection to an L-GW), the MME/SGSN may be configured to activate SIPTO@LN using procedures for SIPTO, (PDN release and reconnect). The APN used for the macro PDN connection may be re-used in a local network.

If the WTRU has a local PDN connection active, (e.g., the WTRU is attached to a femtocell and has a PDN connection to an L-GW), as a well as a PDN connection towards a PGW, for per APN SIPTO@LN, the MME/SGSN may activate SIPTO@LN, (by performing a PDN release and reconnect). In such a case, the traffic associated to the macro APN may be offloaded to the LHN via the L-GW.

For per flow SIPTO@LN, operator policies for IP interface selection (OPIIS) rules may be used. OPIIS rules, (installed at an access network discovery and selection function (ANDSF)), may indicate routing policies for a specific APN to the WTRU. The WTRU may offload traffic based on the OPIIS rules once there is a local APN connection, (i.e., a PDN connection towards an L-GW defined by a specific local APN). Thus, per flow SIPTO@LN may be possible when the WTRU initiates a local connection, (with a specific local APN). Once the local APN is active, (i.e., a local PDN connection to an L-GW is defined by a specific local APN), the WTRU may use OPIIS rules to route flows that are current via the macro APN connection to the local APN connection. Alternatively, an MME/SGSN may instruct the WTRU to activate a local connection while having the macro PDN connection active.

The handling of the APN when the MME/SGSN instructs the WTRU to perform SIPTO@LN is described in greater detail hereafter. In one embodiment, the APN used by the WTRU over the 3GPP macro network may be re-used to establish a PDN connection to the local network via the L-GW. Methods are described in greater detail wherein the L-GW (and local network operator) may not understand the APN of the macro operator.

The WTRU may be configured to use the LIPA APN to offload traffic to the local network. The L-GW may be responsible to detect internet traffic (from local traffic) and route it over the internet The APN used in the macro network may be re-used, provided that the PDN subscription contexts contained in the HSS include an indication whether SIPTO@LN is allowed or prohibited for this APN. If SIPTO@LN is allowed for this APN, the MME/SGSN may also check if SIPTO@LN is allowed to the LHN the WTRU is attached to, by checking the HeNB-ID or CSG-ID, or LHN information (e.g., LHN-ID) reported, before activating SIPTO@LN.

The MME/SGSN may indicate the APN to use to offload traffic to the local network to the WTRU. An additional parameter may be included to inform the WTRU of the APN to be used when establishing a PDN connection over the LHN. The APN may be part of the subscription information stored in the HSS. The local APN name may be provided to the WTRU when the MME/SGSN deactivates the relevant PDN connections using the "reactivation requested" cause value. The WTRU then re-establishes those PDN connection(s) with the new APN name to the LHN via the L-GW. The L-GW may be aware that the APN is used to offload traffic to the Internet.

The WTRU may be pre-configured with an APN to use when attaching to specific local networks. An additional indication may be used by the MME/SGSN to instruct the WTRU to use perform SIPTO@LN. The SIPTO@LN indication may be used when the MME/SGSN deactivates the relevant PDN connections using the "reactivation requested" cause value. The WTRU may then re-establish at least one PDN connection with the new APN name to the local network via the L-GW.

The MME/SGSN may determine when SIPTO@LN is possible, (i.e., when the L-GW in the LHN has a connection to the Internet. In one embodiment, the criteria for the MME/SGSN to initiate SIPTO above the RAN, (i.e., SIPTO between P-GW in the macrocell), may be based on per tracking area identity (TAI)/routing area identity (RAI) or eNodeB identity advertised during routing area update (RAU)/tracking area update (TAU) signalling.

In another embodiment, SIPTO@LN may be allowed and additional criteria may be used. The additional criteria may be based on CSG-ID and/or HeNB-ID and/or LHN-ID reported to the MME/SGSN during RAU/TAU or attach signalling.

Figure 9:
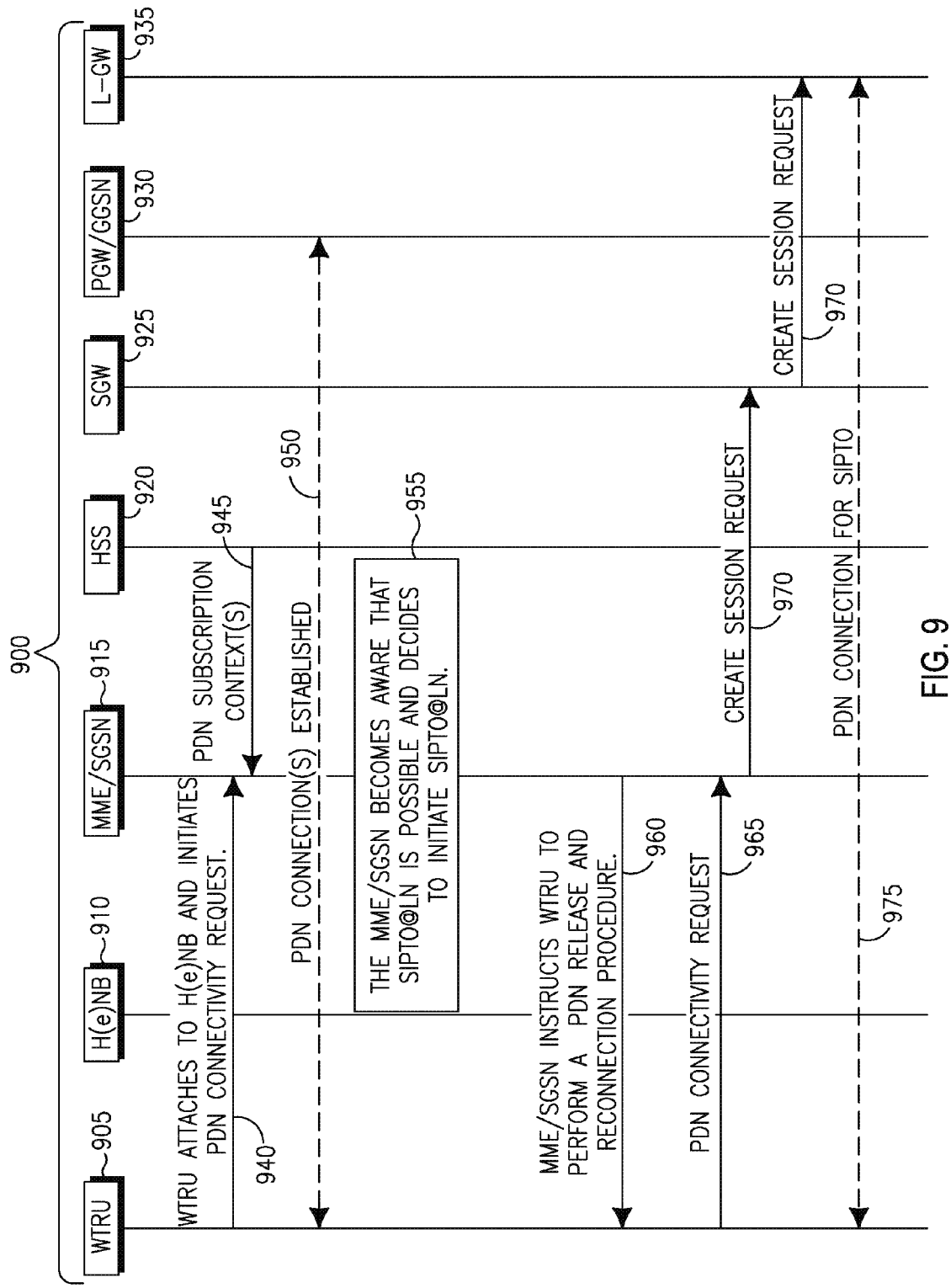
FIG. 9 shows an example of a decision by a mobility management entity (MME)/serving general packet radio service (GPRS) support node (SGSN) to perform SIPTO@LN on a per access point name (APN) basis.

FIG. 9 is a flow diagram of a procedure implemented in a wireless communication system 900 for performing SIPTO@LN on a per APN basis. The system 900 may include at least one WTRU 905, at least one H(e)NB 910, an MME/SGSN 915, an HSS 920, an SGW 925, a PGW/gateway GPRS support node (GGSN) 930 and an L-GW 935. The WTRU 905 may attach to the H(e)NB 910 and establish a PDN connection to the PGW/GGSN 930 by initiating a PDN connectivity request 940. During the WTRU's initial attachment, the HSS 920 may provide PDN subscription context(s) 945 to the MME/SGSN 915, and at least one PDN connection 950 may be established between the WTRU 905 and the PGW/GGSN 930. The PDN permission context(s) 945 may indicate to the MME/SGSN 915 the SIPTO permissions for an APN provided by the WTRU 905. The SIPTO permissions may include information relating to whether SIPTO@LN is allowed for this APN. The PDN subscription context(s) 945 may include information relating to whether the local network where the WTRU 905 is registered or attached supports SIPTO@LN. Local network information may be based on the HeNB-ID and/or CSG-ID and/or LHN information (e.g., LHN-ID) reported to the MME/SGSN 915 during a TAU or a RAU, or at the initial attach. Alternatively, local network information indicating whether SIPTO@LN is supported may be pre-configured at the MME/SGSN 915. In such case, this information may be applicable for all WTRUs accessing this MME/SGSN 915.

The MME/SGSN 915 may become aware that SIPTO@LN is possible and may then decide to initiate SIPTO@LN (955), based on SIPTO permissions for this APN as well as the local network information during a TAU/RAU procedure or when the MME/SGSN 915 is informed of WTRU handover to an HeNB, (i.e., by checking if the CSG-ID, HeNB-ID and/or LHN-ID reported during handover or TAU/RAU is allowed for SIPTO@LN). The decision to initiate SIPTO@LN may be based on operator policy. For example, the MME/SGSN 915 may decide to offload traffic due to network congestion or overload of the MME/SGSN 915. Local network information may be stored locally at the MME/SGSN 915 or stored in the HSS 920.

The MME/SGSN 915 may initiate SIPTO@LN and instruct the WTRU 905 to perform a PDN release and reconnection procedure (960). The MME/SGSN 915 may indicate to the WTRU 905 the APN to use when establishing a PDN connection to an LHN. The APN may be part of the PDN subscription context of the subscriber or pre-configured at the MME/SGSN 915. The APN may be provided to the WTRU 905 when the MME/SGSN 915 deactivates the relevant PDN connections using a "reactivation requested" cause value. The MME/SGSN 915 may include an indication that SIPTO@LN is carried out. In such a case, the MME/SGSN 915 may include the indication within the "reactivation requested" cause value. Before initiating the PDN release (i.e., disconnection), the MME/SGSN 915 may check whether the user of the WTRU 905 accepts the offload via the home network. It may be assumed that the user has accepted SIPTO@LN or that the operator did not provide an indication to the user whether SIPTO@LN may be accepted.

The WTRU 905 may establish a PDN connection via the LHN, (HeNB 910), to the MME/SGSN 915 by sending a PDN connectivity request 965. Based on the alternatives on the configuration of the APN, the WTRU 905 may re-use the same APN used to establish a PDN connection over the macro network. Based on configuration, the same APN may also be used for establishing a LIPA PDN connection. The WTRU 905 may use the APN provided by the MME/SGSN 915. The WTRU 905 may use a pre-configured APN if a SIPTO@LN indication is included in the PDN reconnection signaling from the MME/SGSN 915.

Upon receiving the PDN connectivity request 965, the MME/SGSN 915 may establish a PDN connection to the L-GW 935. In E-UTRAN, a create session request 970 may be received by the SGW 925 before it is sent to the L-GW 935. The L-GW 935 may be aware that the APN used is for SIPTO@LN and diverts traffic to the Internet. If an APN is also used for a LIPA connection, then the L-GW 935 may route non-local traffic to the Internet. A PDN connection for SIPTO may then be established between the WTRU 905 and the L-GW 935 (975).

Figure 10:
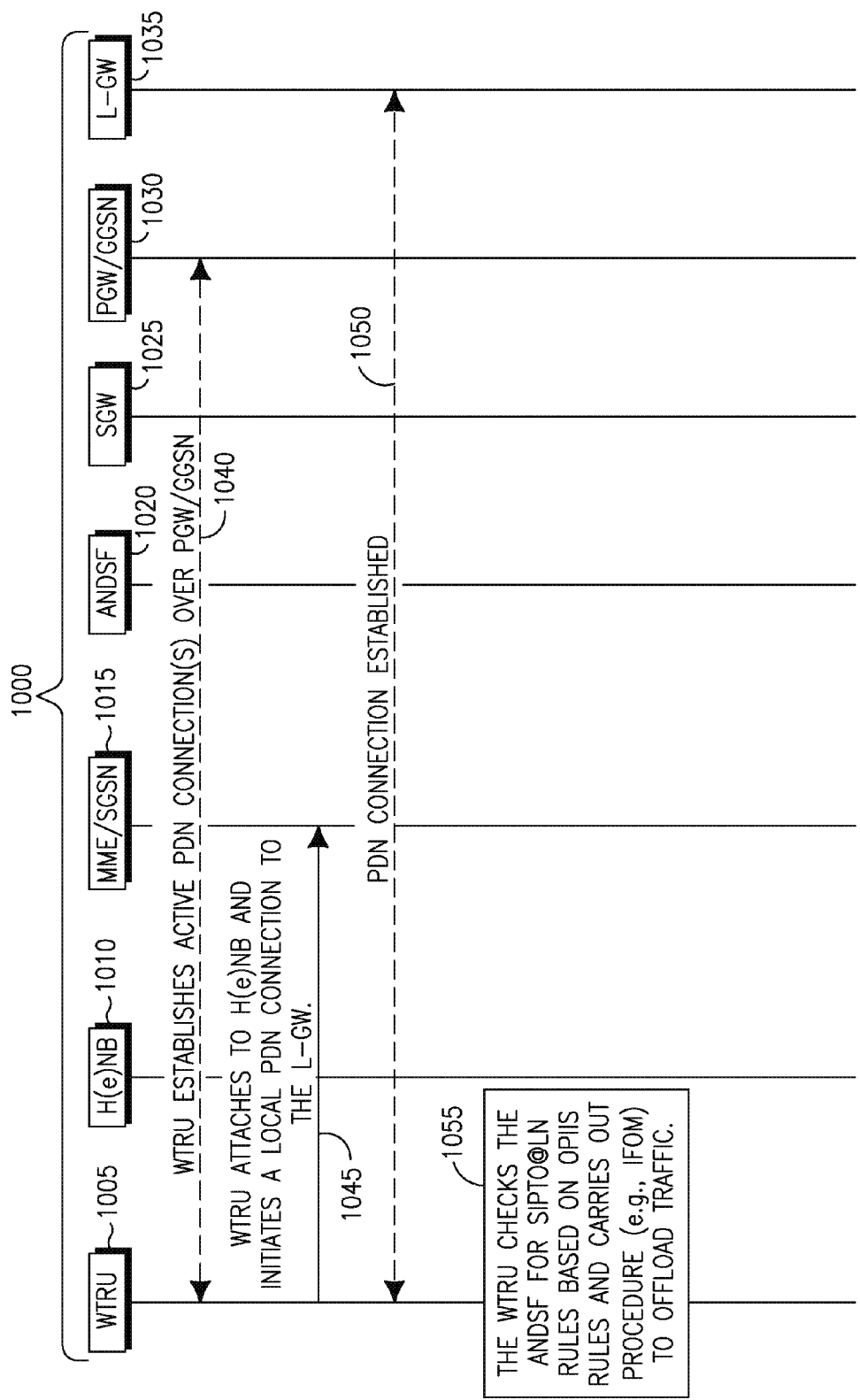
FIG. 10 shows a flow diagram of a per flow SIPTO@LN.

FIG. 10 is a flow diagram of a procedure implemented in a wireless communication system 1000 for performing SIPTO@LN on a per flow SIPTO@LN basis. The system 1000 may include at least one WTRU 1005, at least one H(e)NB 1010, an MME/SGSN 1015, an ANDSF 1020, an SGW 1025, a PGW/GGSN 1030 and an L-GW 1035. The WTRU 1005 may establish active PDN connection(s) over the PGW/GGSN 1030 (1040). The WTRU 1005 may also attach to the H(e)NB 1010 and initiate a local PDN connection to the L-GW 1035 (1045). The WTRU 1005 may establish a local PDN connection 1050 to the L-GW 1035 using a local APN. The WTRU 1005 may check the ANDSF

1020 for SIPTO@LN rules based on OPIIS rules, and carry out procedures, such as IP Flow Mobility (IFOM) to offload traffic to the local APN, and ask permission from the user to offload traffic locally (1055). The WTRU 1005 may identify that the local APN supports per flow SIPTO@LN, and identify the IP flows that may be routed over to the local APN.

Figure 11:
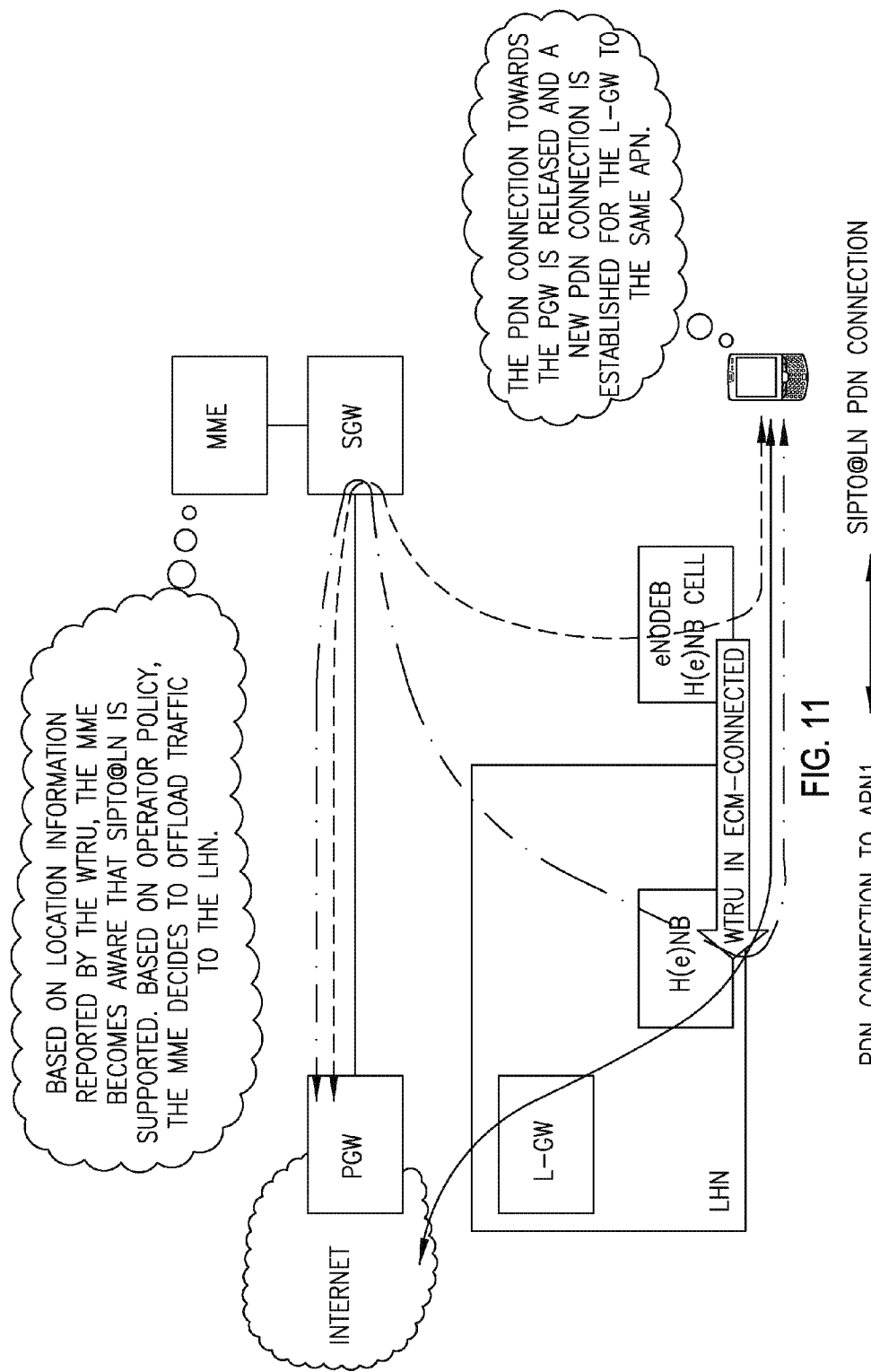
FIG. 11 shows an example of a per SIPTO@LN when a WTRU handovers from an eNB or H(e)NB to an HeNB cell (WTRU in a connected mode)
Figure 12:
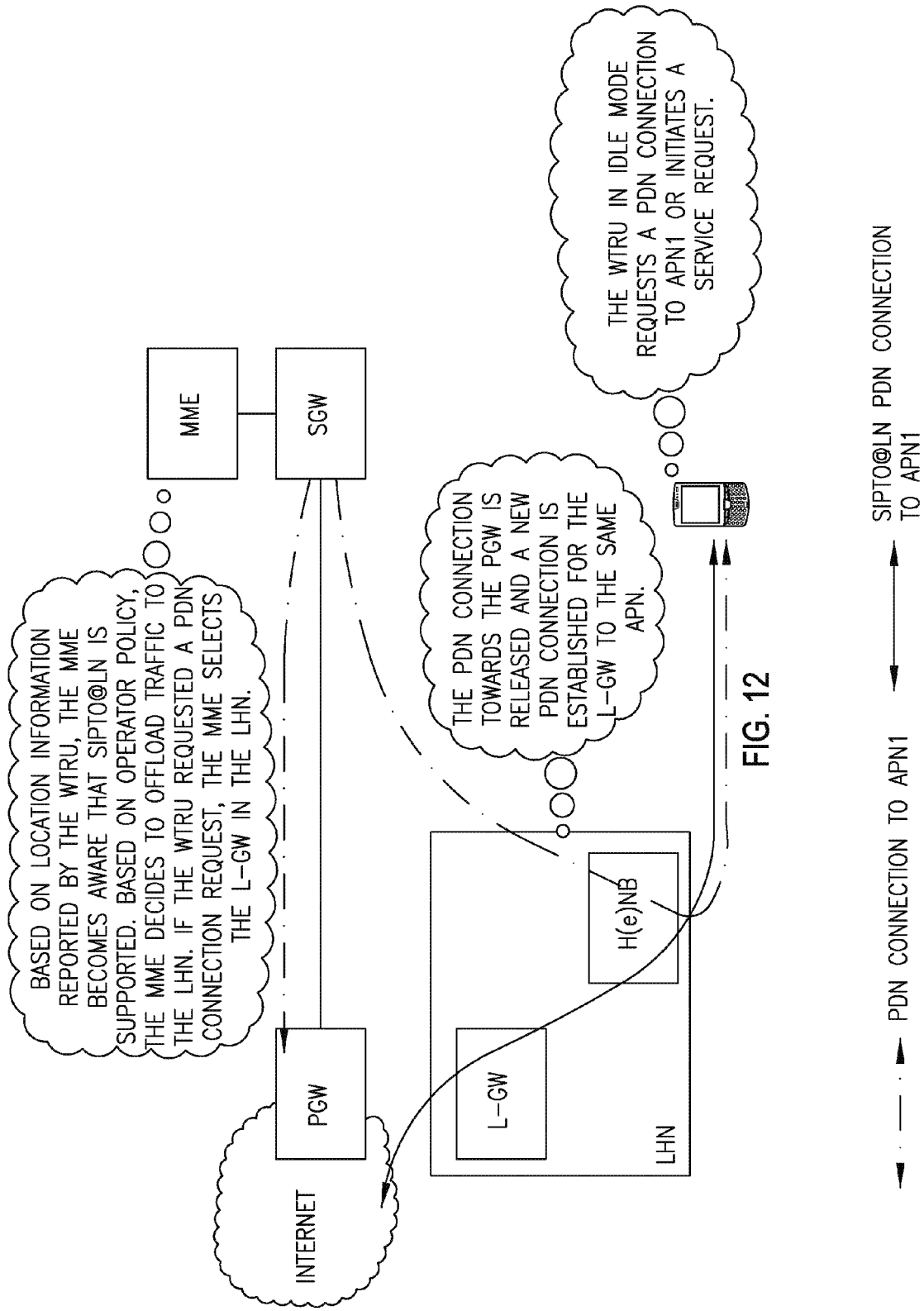
FIG. 12 shows an example of a per SIPTO@LN when a WTRU in idle mode is camped to an H(e)NB cell.
Figure 13:
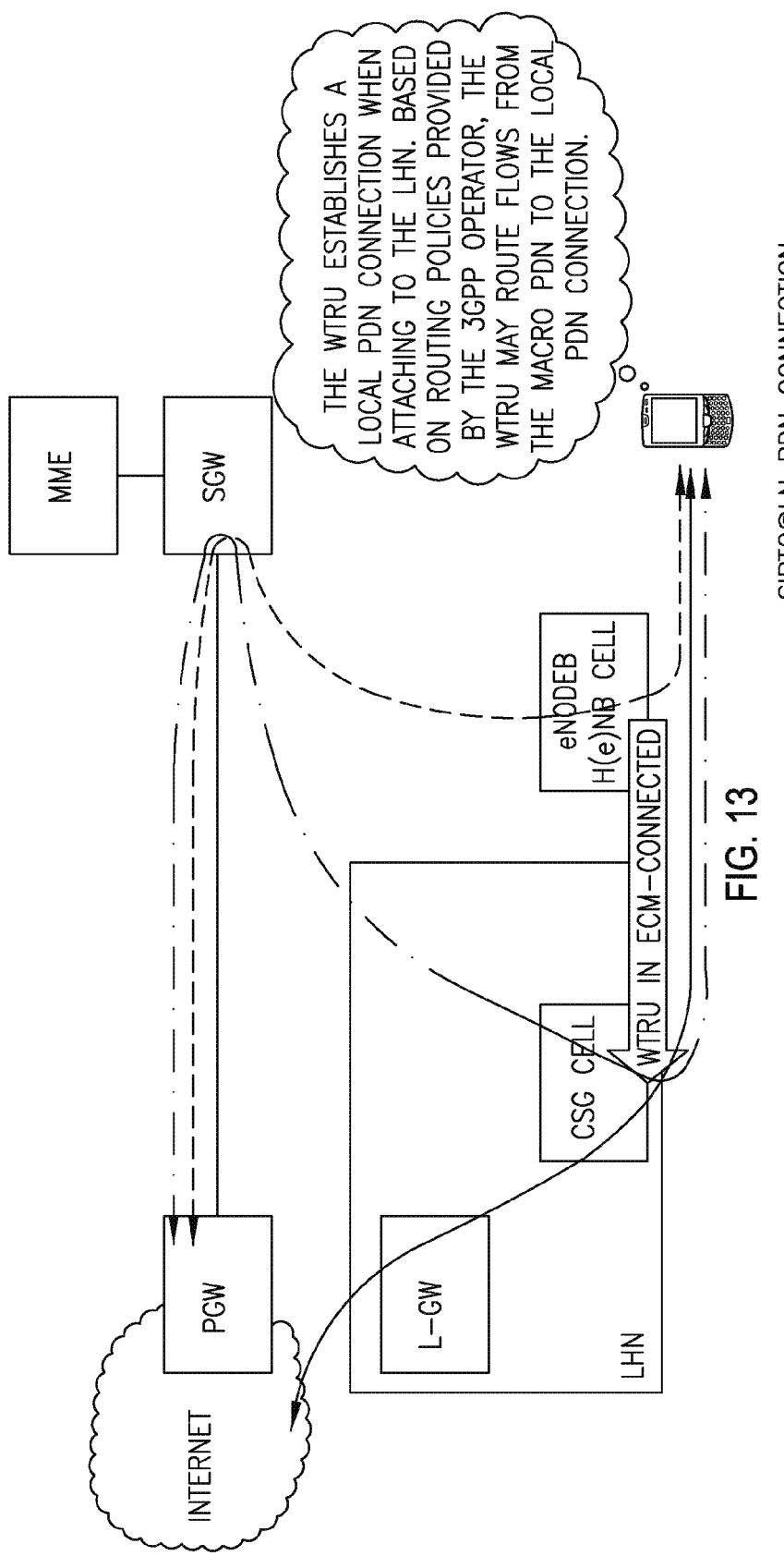
FIG. 13 shows an example of a per SIPTO@LN when a WTRU establishes a PDN connection to a local network.

FIG. 11 shows an example for per APN SIPTO@LN where a WTRU is in connected mode. FIG. 12 shows an example for per APN SIPTO@LN where the WTRU is in an idle mode. For all cases the same SIPTO@LN procedure is followed which consists of release of the PDN connection terminated at the PDN-GW in the mobile operator premises, followed by establishment of a new PDN connection to the same APN in an LHN that selects an L-GW. FIG. 13 shows an example for per flow SIPTO@LN.

The WTRU that is subscribed for SIPTO attaches to an H(e)NB subsystem. In that case, the network, based on the WTRU subscription, may carry out SIPTO at the LHN, thus offloading traffic from the macro-network to the L-GW in the femto (H(e)NB) network, and avoiding signaling to go via the 3GPP macro network to reduce congestion.

Currently, there are no solutions proposed to allow the 3GPP operator to provide policies to the WTRU that may assist the WTRU in routing IP flows from an existing PDN connection to the 3GPP network to a PDN connection in the LHN in order to carry out SIPTO at the LHN, regardless of whether or not the WTRU has established IP connectivity to the LHN.

In addition, it is currently unclear how the user may consent to offload specific IP flows to the LHN via ANDSF policies. Currently, user consent may be stored in the user's subscription profile in the HSS, and the ANDSF may not query the HSS to obtain the user's subscription profile for SIPTO@LN consent.

A solution is proposed by defining specific routing policies for SIPTO@LN that may be provided to the WTRU by the ANDSF. The solution provides alternatives for the structure of the ANDSF policies that may assist the WTRU to route IP flows to the local connection. More specifically, ANDSF rules may be established to allow the WTRU to create a local connection to the L-GW, (if the WTRU has no local connection established), as well as rules to indicate to the WTRU which IP flows may be offloaded to the local network.

The solution may cover the scenarios where the WTRU is attached to an H(e)NB with no active PDN connection at the L-GW, and the WTRU has an active PDN connection via the 3GPP network, the WTRU is registered to a local network but has no active PDN connection, (the WTRU may have an active PDN connection via the PGW), and the WTRU may have an active PDN connection via the 3GPP network and is in close proximity to an LHN.

The ANDSF may be used to configure policies and rules in the WTRU for the purpose of accessing PDN networks, including local networks, to offload IP traffic, (i.e., using a SIPTO mechanism), on a per IP flow basis. A managed object may be defined within the ANDSF to allow the configuration of the policies. Policies defined within the ANDSF may include a condition for a WTRU to trigger per-flow traffic offload to a local network based on user preferences or user consent.

The ANDSF procedures may be updated to allow the ANDSF to provide per IP flow SIPTO@LN policies to the WTRU. By using enhanced ANDSF policies, the mobile operator may define policies to allow the WTRU to route specific IP flows from the 3GPP core network to the local network, as well as define conditions for the WTRU to setup a local IP connection.

Currently, in 3GPP, there are solutions using ANDSF policies (based on the work carried out in the OPIIS work item) that may be used to route IP flows between accesses. However, this solution assumes that the WTRU has active IP connections to both accesses before any routing of IP flows can take place. There are currently no procedures where specific SIPTO@LN policies are defined in the ANDSF that may instruct the WTRU to create an IP connection to a specified APN for SIPTO at the local network.

In addition, additional procedures are proposed via ANDSF to allow the user to provide an indication of user consent for traffic offload that would satisfy the SIPTO@LN requirements for user consent. Based on mobile operator SIPTO policies and configured user consent per APN, the network may be able to offload traffic. Thus, the user may consent before the WTRU may establish a new PDN connection to a specified APN before any IP flow may be offloaded to the local network based on per flow SIPTO@LN policies. In addition, the user consent may be subscription based, (i.e., stored in the user profile in the HSS). However, if enhanced ANDSF rules are used for per flow SIPTO@LN, then an issue may arise since the WTRU may not contact the HSS for an ANDSF based procedure. It is proposed to use an existing ANDSF procedure where the ANDSF may provide SIPTO@LN policies based on the permanent identity of the WTRU. The ANDSF may also be provided with user/WTRU specific SIPTO@LN policies from the HSS/SPR by using new interfaces from the ANDSF to the HSS or SPR.

The procedure to carry out per flow SIPTO@LN is based on enhanced ANDSF rules the ANDSF provides to the WTRU. The enhanced ANDSF rules may be based on the ANDSF rules used for inter-APN routing. Alternatively, separate rules for per flow SIPTO@LN may be specified.

The policies for per flow SIPTO@LN can be statically configured in the WTRU or they could be provisioned by the ANDSF. The statically configured policies in the WTRU have higher priority from policies provisioned from the ANDSF. For example, if the ANDSF provides a specific APN (APN1) for a specific IP flow, (e.g., IP 100.100.100.100 at port 80), and the WTRU has a statically configured APN (APN2) for the same IP address and port, the WTRU may use APN2 to route flows.

Each per flow SIPTO@LN rule may provide one or more filter rule information to the WTRU, each filter rule identifying a prioritized list of APNs which may be used by the WTRU to route IP flows that match specific IP filters. A filter rule may also identify which APNs may be restricted for IP flows that match specific IP filters. For example, the WTRU may activate this rule for all PDN connections the WTRU has to the specific APN. The filter rules may also assist the WTRU in selecting an interface based on the APN, (assuming that the WTRU is aware that an interface is linked to a specific APN).

Each per flow SIPTO@LN rule may provide IP flow routing information to the WTRU, (e.g., IP address, port number, protocol, quality of service (QoS)).

Each per flow SIPTO@LN rule may provide an indication to the WTRU to establish a local PDN connection to the L-GW, (when the WTRU has not established local PDN connection), to a particular APN. For example, a new IP connection may be dynamically created once the WTRU attaches or is handed over to an LHN.

Each per flow SIPTO@LN rule may provide validity condition information, (i.e., conditions indicating when the provided policy is valid). The validity condition information may describe the cases where SIPTO@LN may be supported in a particular LHN. The per IP flow SIPTO@LN ANDSF policies may include routing criteria, which indicate to the WTRU that the SIPTO@LN policy may be valid when the WTRU is attached to an H(e)NB with a specific CSG-ID or cell-ID, (e.g., routing criteria include all HeNB/CSG-IDs that are part of an LHN connected to an L-GW supporting SIPTO@LN). If routing criteria are not included within the SIPTO@LN routing rule, the policy may be applicable for all PDN connections to the APN stated in the routing rule.

Figure 14:
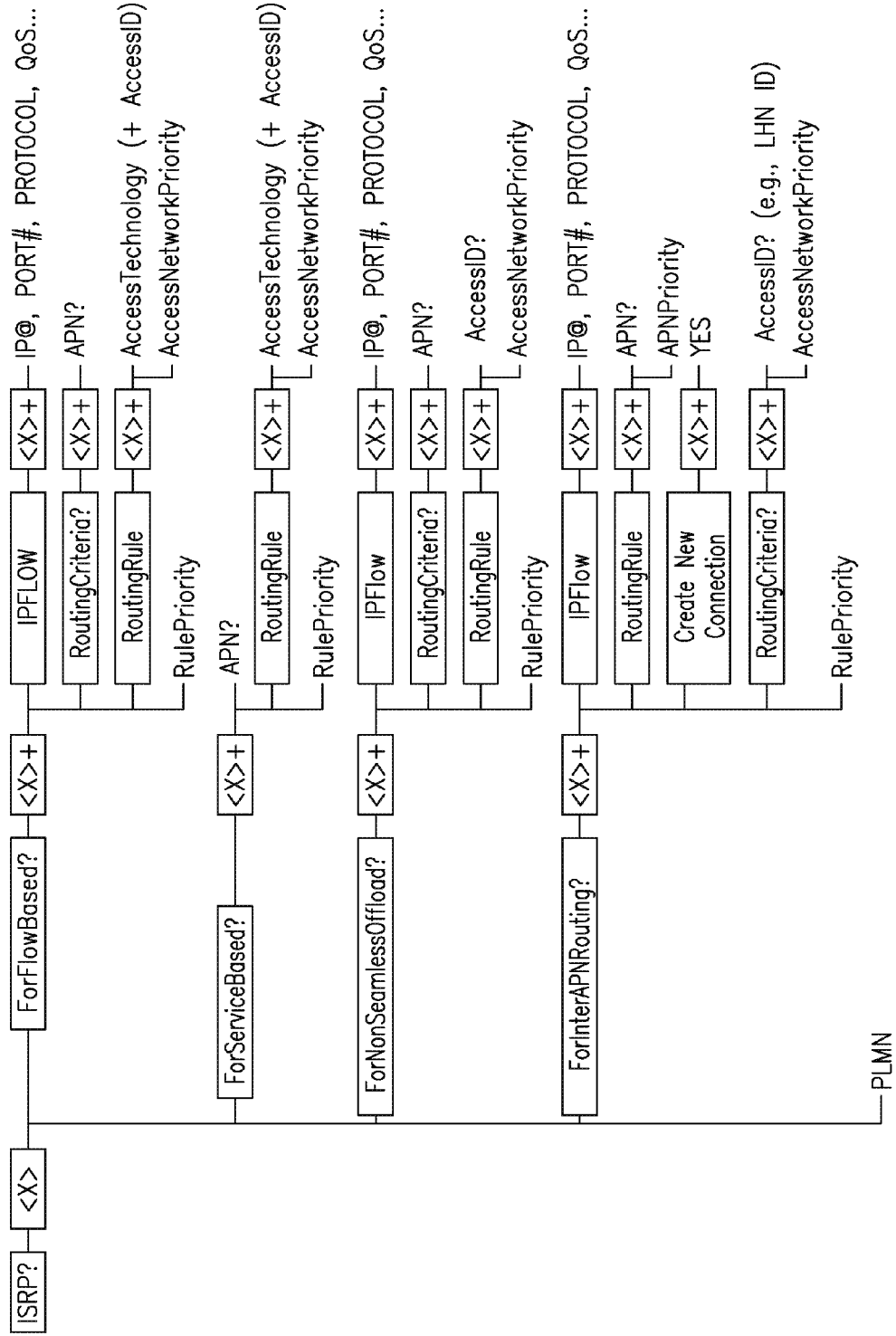
FIG. 14 shows enhanced access network discovery and selection function (ANDSF) rules for per flow SIPTO@LN policies (based on an inter-APN routing policy (TARP))
Figure 15:
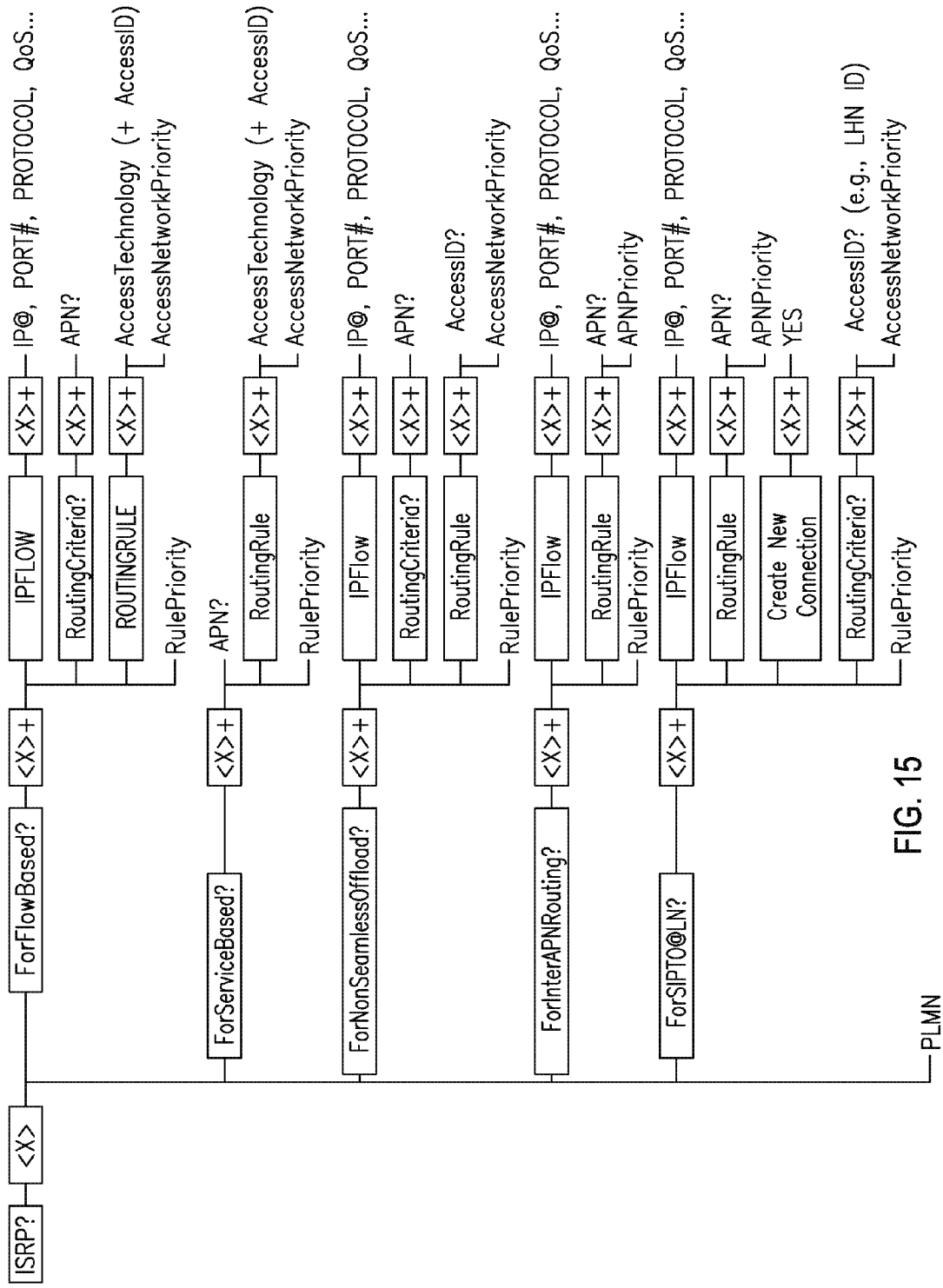
FIG. 15 shows enhanced ANDSF rules for per flow SIPTO@LN policies (extending an inter-system routing policy (ISRP) to include separate policies for SIPTO@LN)
Figure 16:
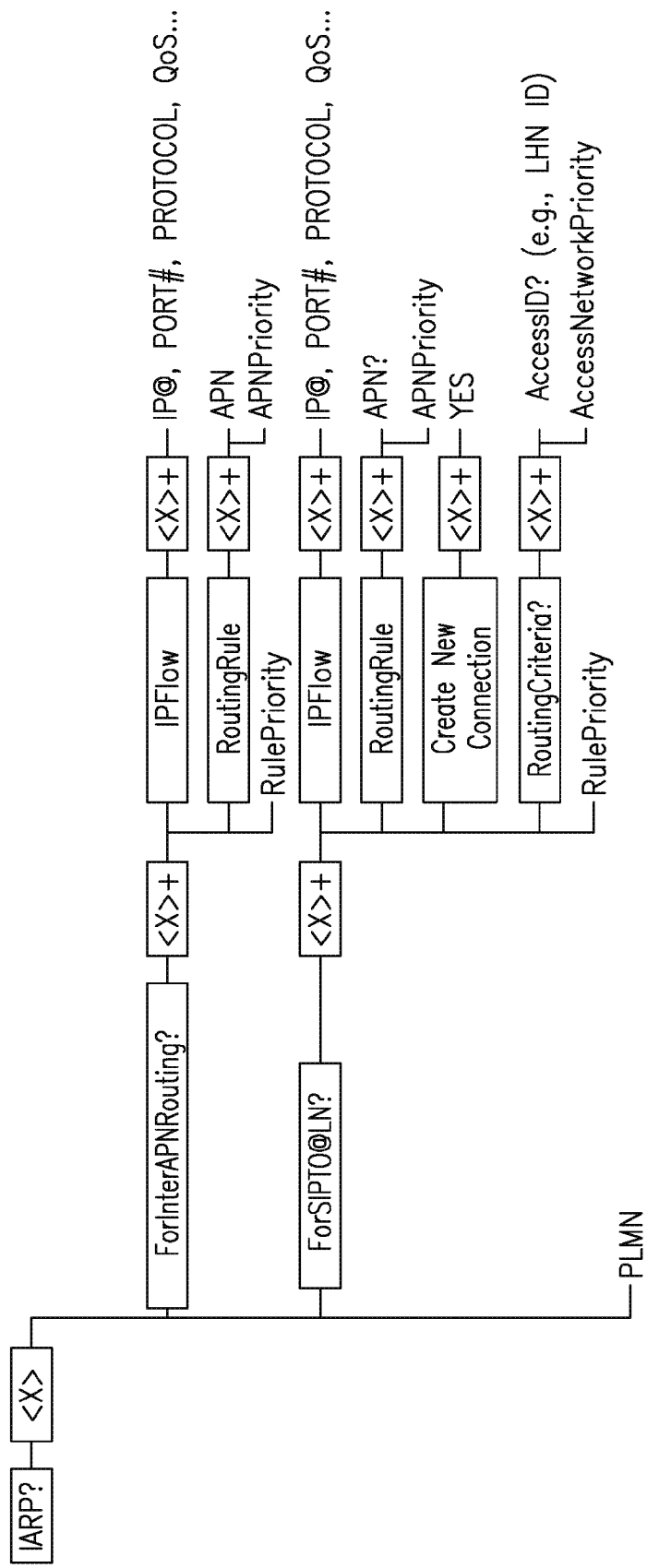
FIG. 16 shows enhanced ANDSF rules for per flow SIPTO@LN policies, (extending an TARP to include separate policies for SIPTO@LN)

The per flow SIPTO@LN policies may be either included as an extension to an inter-service routing policy (ISRP), an inter-APN routing policy (IARP) or considered as a separate rule within the ANDSF. A variation of the enhanced ANDSF rules for per flow SIPTO@LN are shown in FIGS. 14-16. These rules may be statically configured at the WTRU or provisioned by the ANDSF, (either through unsolicited provisioning—push mode, or in response to a query from the WTRU—pull mode).

FIG. 14 shows an example where an IARP include per flow SIPTO@LN policies. Two additional leafs are proposed to be included. A "create new connection" leaf may provide an indication to the WTRU to establish a local IP connection to the local's network L-GW using the APN of the routing rule. A "routing criteria" leaf may provide information that the rule is valid only to a specific LHN that supports traffic offload using SIPTO at the LHN. This leaf may provide information such as the cell-ID of the HeNB the WTRU is attached to, or alternatively the CSG-ID. In such a case, the WTRU may activate this rule only if it is attached to a specific HeNB.

FIG. 15 show examples where an ISRP may include per flow SIPTO@LN policies, and FIG. 16 shows an TARP may include additional per flow SIPTO@LN policies. The "create new connection" leaf and the "routing criteria" leaf may be included in the ISRP and the IARP. A new leaf (per flow SIPTO@LN) may be included under the ISRP leaf and the TARP leaf that includes IP flow information that may be routed using SIPTO@LN, and one or more filter rules, each one identifying a prioritized list of APNs which may be used by the WTRU to route IP flows that match specific IP filters. A filter rule may also identify which APNs are restricted for IP flows that match specific IP filters.

In order for per flow SIPTO@LN to be carried out, user consent may be required. If ANDSF rules are used by the WTRU to initiate per flow SIPTO@LN, an issue may arise since the WTRU may not contact the HSS to obtain subscription information. When the WTRU queries the ANDSF for appropriate rules, the WTRU may provide its permanent WTRU identity (e.g., international mobile subscriber identity (IMSI)) to the ANDSF. Subject to an operator's configuration, the ANDSF may obtain the permanent WTRU identity. In addition, based on subscription data provided, the ANDSF may use the permanent WTRU identity to allow the ANDSF to select inter-system mobility policies, access network discovery information and ISRPs.

The same procedure may be used for the ANDSF to select per flow SIPTO@LN policies. When the WTRU provides a permanent WTRU identity and the ANDSF contains specific per flow SIPTO@LN policies for this WTRU, (i.e., for the provided permanent WTRU identity), the ANDSF may provision updated ANDSF rules to the WTRU, (i.e., a pull mode operation). The ANDSF may also provide unsolicited updated ANDSF rules to the WTRU if the ANDSF knows the permanent WTRU identity of the WTRU (i.e., a push mode operation).

Figure 17:
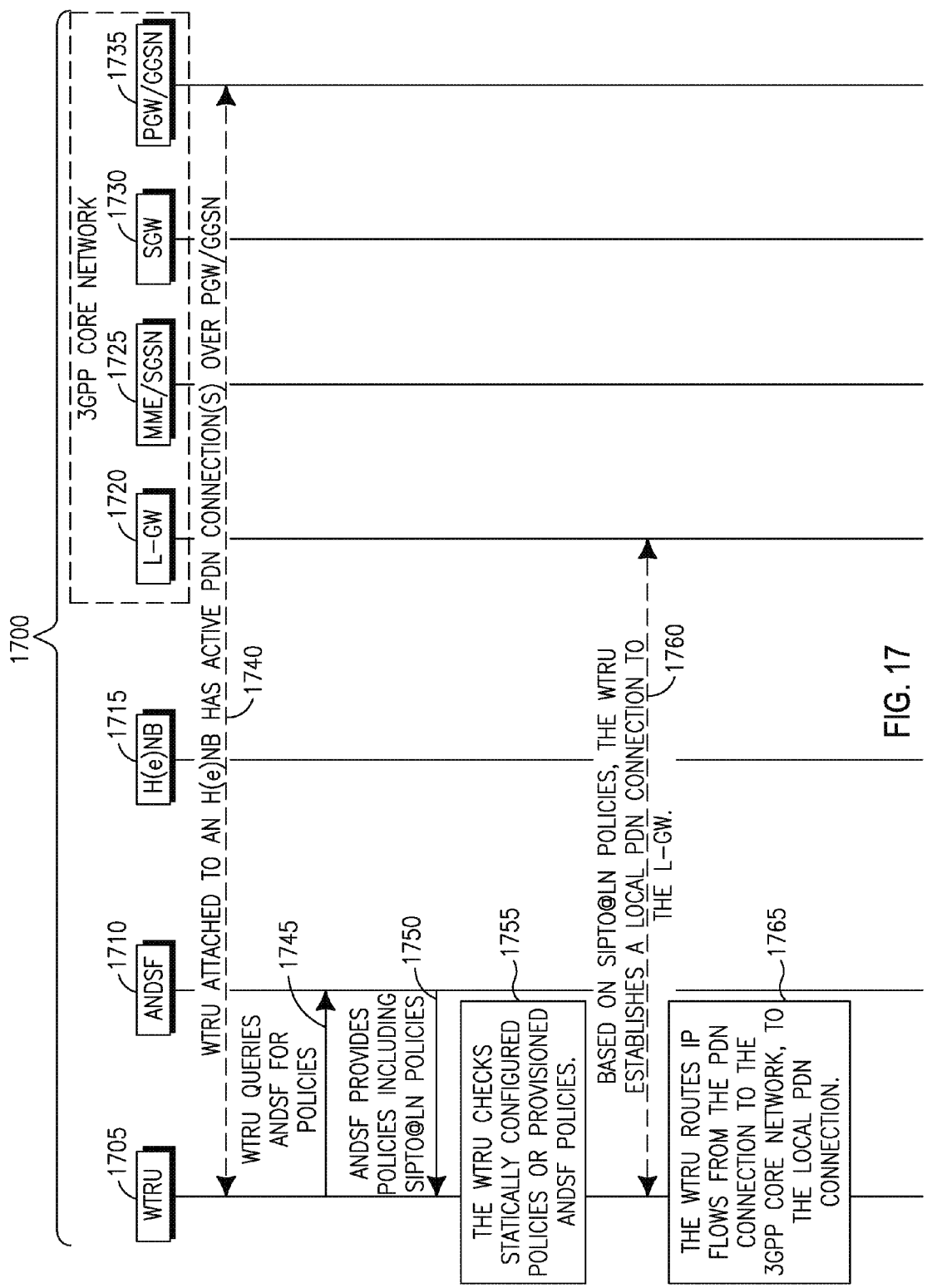
FIG. 17 shows per flow SIPTO@LN signal flows when a WTRU has no active local PDN connection.

FIG. 17 shows per flow SIPTO@LN signal flows in a wireless communication system 1700 when a WTRU has no active local PDN connection. The system 1700 may include at least one WTRU 1705, an ANDSF 1710, at least one H(e)NB 1715, an L-GW 1720, an MME/SGSN 1725, an SGW 1730 and a PGW/GGSN 1735. The WTRU 1705 may be attached to the H(e)NB that is part of an LHN and may have active PDN connection(s) via the H(e)NB 1715 towards the PDN-GW 1735 in a 3GPP network (1740). It is assumed that the WTRU 1705 has not established a local connection towards the L-GW 1720. The WTRU 1705 may query the ANDSF 1710 for new or updated policies (1745). The WTRU 1705 may include its permanent WTRU identity in the request to the ANDSF 1710. If the WTRU 1705 has provided its permanent WTRU identity, the ANDSF 1710 may check if there are specific policies for this WTRU 1705 (based on the permanent WTRU identity).The ANDSF 1710 may provide policies to the WTRU 1705, (including SIPTO@LN policies), (1750). The WTRU 1705 may determine based on SIPTO@LN policies that a local connection is required to the L-GW 1720 (1755). In addition, the WTRU 1705 may determine, by inspecting the uplink IP flows, that a particular IP flow may be offloaded to the local connection. The WTRU 1705 may establish a local connection using the APN specified in the SIPTO@LN routing rule (1760). The WTRU 1705 may route the IP flows from the PDN connection in the 3GPP network with a specific APN to the local PDN connection of a specific APN, according to the SIPTO@LN routing rules (1765). The routing of the IP flows may be carried out via a connection manager of the WTRU 1705, (i.e., the offload may be transparent to the 3GPP core network).

The mobile operator may install dynamically updated per IP flow SIPTO@LN policies in the ANDSF. New interfaces may be implemented between the HSS and ANDSF, or the SPR and the ANDSF. The operator may also install dynamically per flow SIPTO@LN policies to the ANDSF from the HSS and/or the SPR. The ANDSF may query the HSS and/or SPR for updated per IP flow SIPTO@LN routing policies based on user's subscription information.

Figure 18:
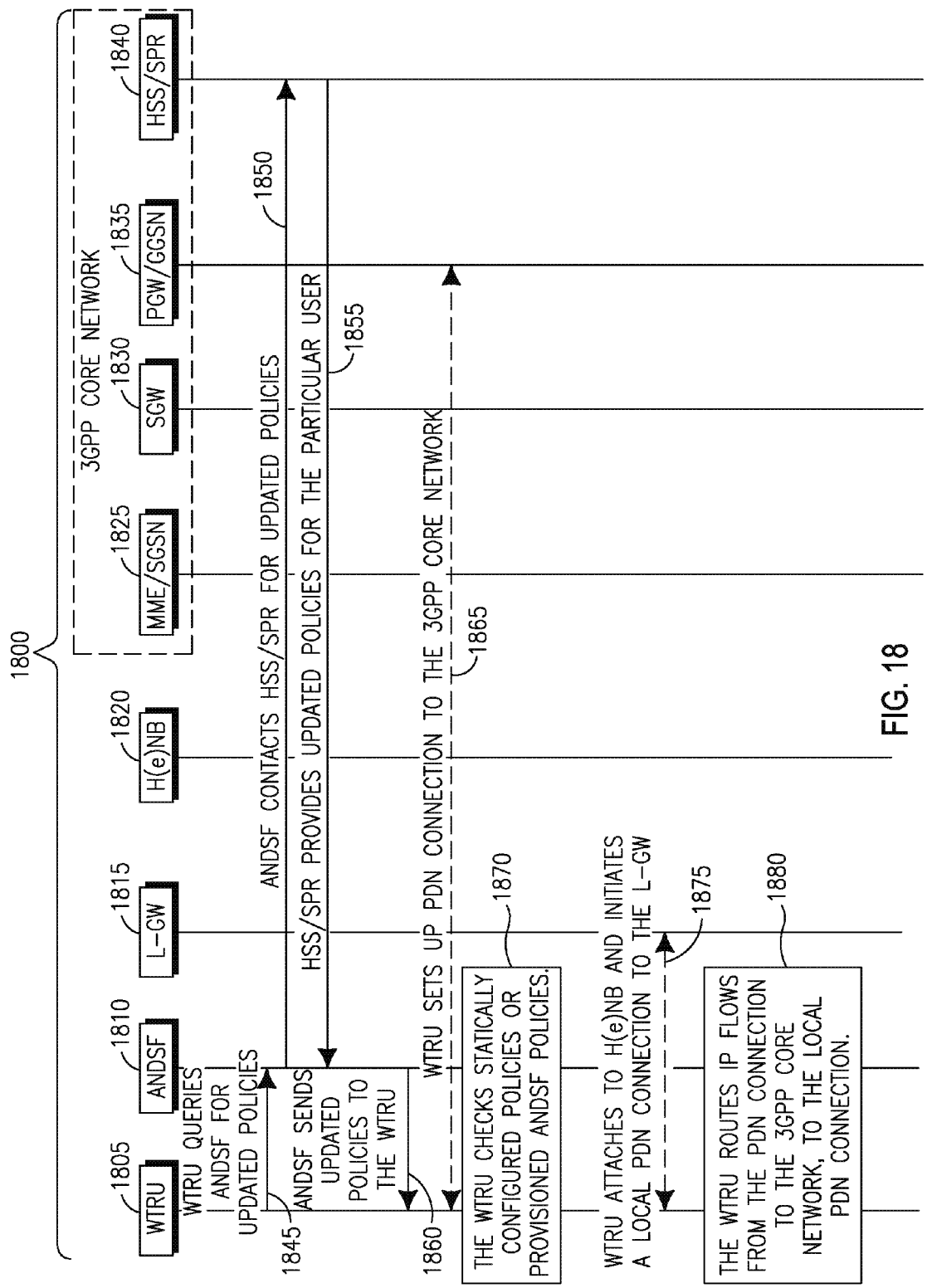
FIG. 18 shows an ANDSF that queries a home subscriber server (HSS)/subscriber profile repository (SPR) for ANDSF policies for a particular user.

FIG. 18 show the case where the ANDSF queries the HSS or SPR, (i.e., pull mode operation), for user profile information in a wireless communication system 1800 including at least one WTRU 1805, an ANDSF 1810, an L-GW 1815, at least one H(e)NB 1820, MME/SGSN 1825, an SGW 1830, a PGW/GGSN 1835 and an HSS/SPR 1840. The WTRU 1805 may query the ANDSF 1810 for updated ANDSF policies (1845). The ANDSF 1810 may contact the HSS/SPR 1840 for new or updated policies based on the permanent WTRU identity (e.g., IMSI) of the user (1850). The HSS/SPR 1840 may provide new or updated policies to the ANDSF 1810 (1855). The ANDSF 1810 may locally install policies and provide to the WTRU 1805 the related ANDSF policies (1860). The WTRU 1805 may connect to the 3GPP core network through a PDN/PDP connectivity request (1865). The WTRU 1805 may check based on statically configured rules at the WTRU 1805 or the ANDSF 1810, provisioned rules that a specific IP flow may be routed locally over the L-GW 1815 (1870). If there is no active local PDN connection to the L-GW 1815, the WTRU 1805 may create a new local PDN connection using a specific APN (based on WTRU policies or ANDSF provisioned rules), (1875). The WTRU 1805 may then route the IP flows accordingly (1880).

Figure 19:
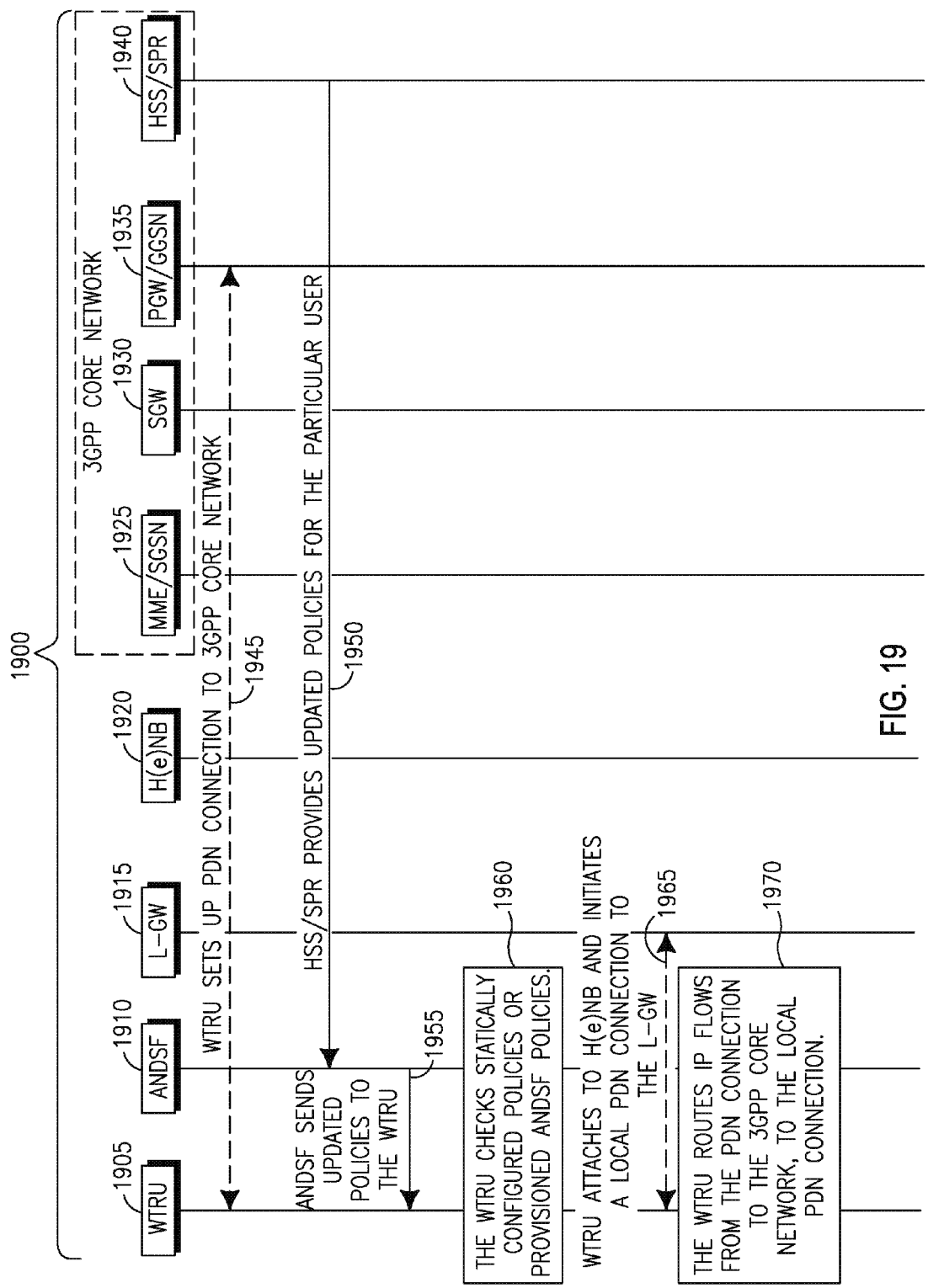
FIG. 19 shows an HSS/SPR that updates an ANDSF with new/updated policies for a particular user.

FIG. 19 shows the case where the HSS or SPR provides the ANDSF with updated user profile information, (i.e., push mode operation) in a wireless communication system 1900 including at least one WTRU 1905, an ANDSF 1910, an L-GW 1915, at least one H(e)NB 1920, MME/SGSN 1925, an SGW 1930, a PGW/GGSN 1935 and an HSS/SPR 1940. The WTRU 1905 may attach to the HeNB 1920 and connect to the 3GPP core network through a PDN/PDP connectivity request (1945). The HSS/SPR 1940 may detect that the related subscription profile for that IP connectivity access network (IP-CAN) session has changed and may provide new or updated policies to the ANDSF 1910 (1950). The ANDSF 1910 may locally install policies and provide to the WTRU 1905 the related ANDSF policies (1955). The WTRU 1905 may check based on statically configured rules at the WTRU 1905 or the ANDSF 1910 provisioned rules that a specific IP flow may be routed locally over the L-GW 1915 (1960). If there is no active local PDN connection to the L-GW 1915, the WTRU 1905 may create a new local PDN connection using a specific APN, (based on WTRU policies or ANDSF provisioned rules), (1960 and 1965). The WTRU 1905 may route the IP flows accordingly (1970).

Figure 20:
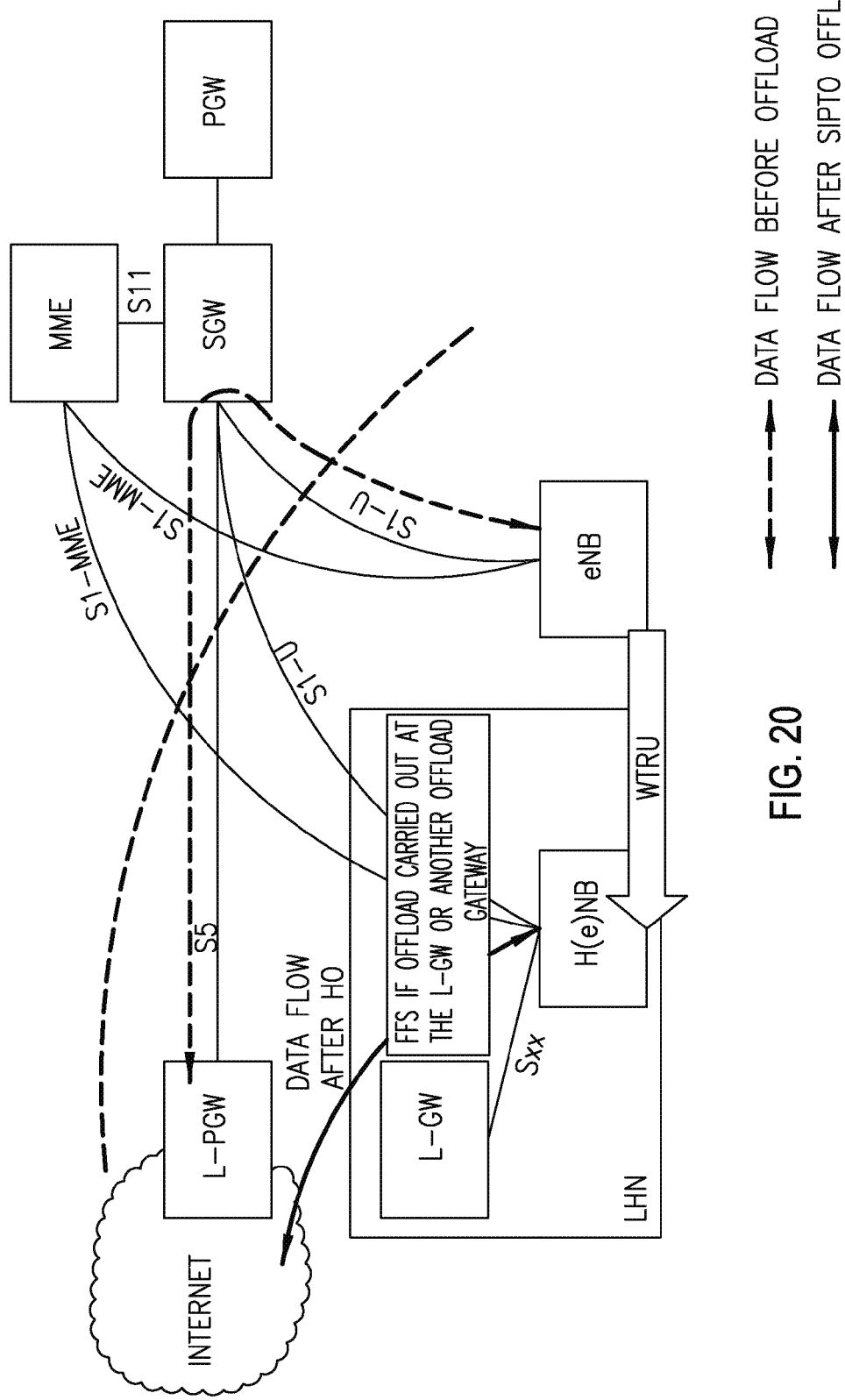
FIG. 20 shows SIPTO mobility above a radio access network (RAN) to a local network (macro to eNB)

FIG. 20 shows SIPTO mobility above a RAN to a local network, (macro to eNB). A WTRU that is subscribed to use SIPTO may attach to an HeNB subsystem. In that case, an MME may carry out SIPTO at a local network, thus offloading traffic from a macro-network to an L-GW in the femto network.

Currently, if a WTRU does not have a LIPA subscription, it is not permitted to access a LIPA network, (i.e., SIPTO at the local network may be carried out only for the case where a SIPTO APN has LIPA permissions set to LIPA-only or LIPA-conditional.

However, a user/operator/service provider may want to allow a WTRU supporting SIPTO to offload traffic in the LIPA local network, but at the same time not allow access to devices attached to the internal network. A determination may be made as to whether SIPTO at the local network may be carried out through an L-GW or through another "offloading local gateway."

Offload to the L-GW may be permitted when the WTRU has a LIPA subscription. There may be cases where the user/operator/local network provider may not want to give the WTRU access to the internal LIPA network.

A WTRU indicating a SIPTO APN may offload to the L-GW. If LIPA permission is set to "LIPA-conditional", the MME may allow offload to a local network only to an HeNB with a specific CSG. However, the WTRU may still have access to the internal LIPA network.

If the MME is configured to allow SIPTO on a per WTRU or per SIPTO APN basis, the MME may allow the WTRU to offload to a LIPA network. However, the subscriber may not be allowed to access other WTRU in the LIPA network.

A new subscription status in the MME may be implemented to allow the MME to offload traffic to the local network in the case where a WTRU and/or APN have SIPTO permissions enabled, and the LIPA permissions are set to "LIPA-offload". The APN used by the WTRU to establish a LIPA PDN connection for SIPTO@LN traffic may be different than the APN used by the WTRU to establish a LIPA PDN connection for LIPA traffic. If the subscriber is only authorized for "LIPA-offload", the WTRU of the subscriber may not be able to access other WTRUs connected to the same L-GW for LIPA access The "LIPA permissions" subscription profile in the HSS may be modified to indicate whether a WTRU is permitted to offload traffic in the LIPA-enabled network, but at the same time not allow access to other LIPA-enabled devices connected to the same internal network. The new LIPA permission may be "LIPA-offload."

When the WTRU attaches to an HeNB subsystem and/or provides a SIPTO APN, the MME may check with the HSS to determine whether SIPTO is allowed for this APN, as well as whether the LIPA permissions for this user/WTRU and/or APN is set to "LIPA-offload." The MME may not initiate SIPTO if there are no LIPA permissions, or the LIPA permissions for this WTRU or APN are set to "LIPA-prohibited."

The MME may initiate SIPTO at the local network if the WTRU and/or WTRU provided APN is subscribed for LIPA, (i.e., LIPA permissions may be LIPA-only or LIPA-conditional). The WTRU may be permitted to access other devices in the LIPA network.

When the LIPA permissions are "LIPA-conditional", the MME may initiate SIPTO at the local network if the WTRU is part of a specific CSG group. The WTRU may be permitted to access other devices in the LIPA network.

Figure 21:
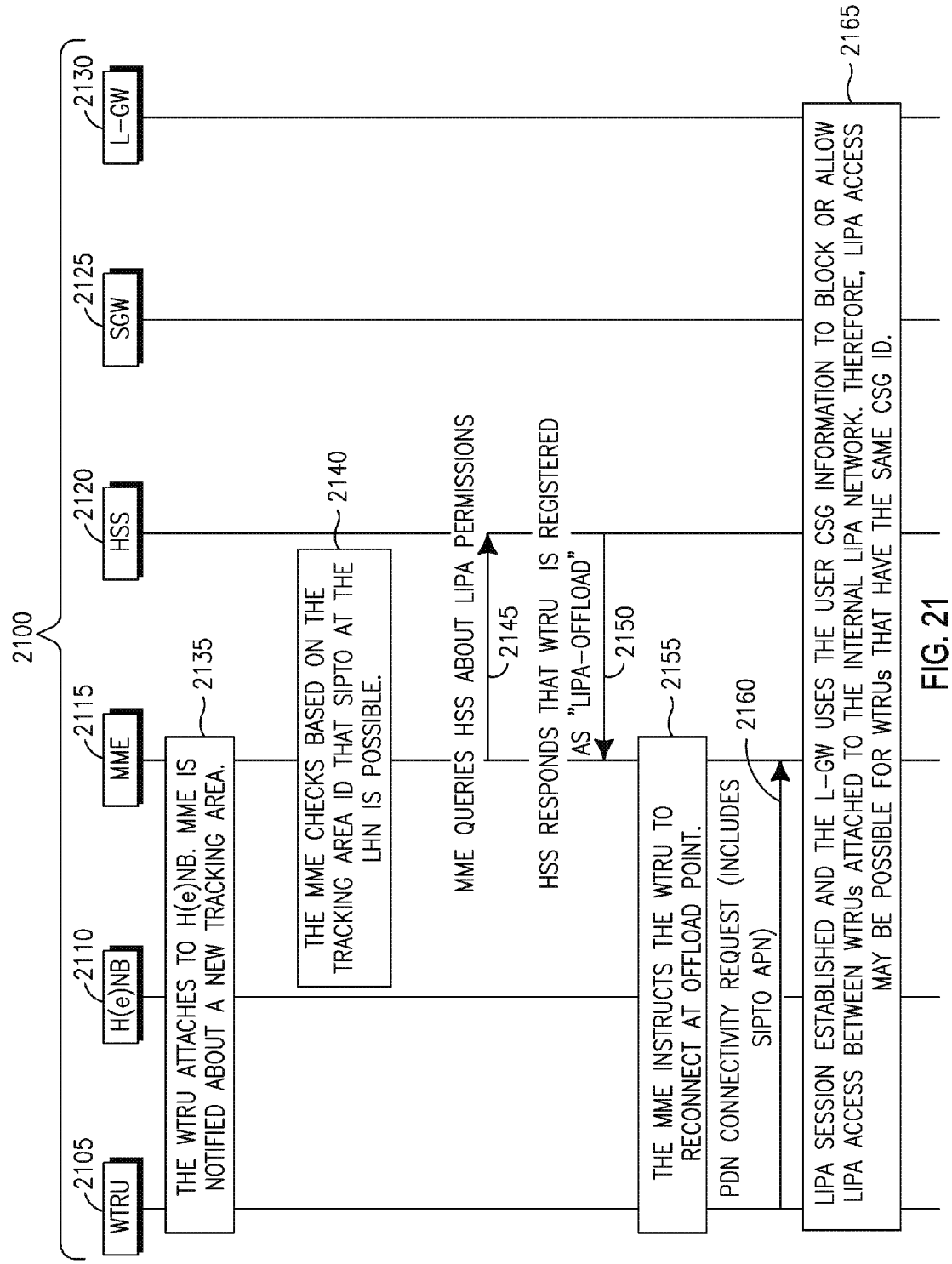
FIG. 21 is a flow diagram of a SIPTO call flow procedure for a SIPTO WTRU registered as "LIPA-offload" in an evolved packet core (EPC) connection management (ECM) idle mode.

FIG. 21 is a flow diagram of a SIPTO call flow procedure for a SIPTO WTRU registered as "LIPA-offload" in an EPS connection management (ECM) idle mode in a wireless communication system 2100 including at least one WTRU 2105, an H(e)NB 2110, an MME 2115, an HSS 2120, an SGW 2125 and an L-GW 2130. The WTRU 2105 may attach to the H(e)NB 2110 and the MME 2115 may be notified about a new tracking area (2135). The MME 2115 may check based on the tracking area ID that SIPTO at the LHN is possible (2140). The MME 2115 may query the HSS 2120 about LIPA permissions (2145), and the HS 2120 may respond that the WTRU 2105 is registered as "LIPA-offload" (2150). The MME 2115 may instruct the WTRU 2105 to reconnect at an offload point (2155), and the WTRU 2105 may initiate a PDN connectivity request including a SIPTO APN (2160). A LIPA session may then be established and the L-GW 2130 may use the user CSG information to block or allow LIPA access between WTRUs attached to the internal LIPA network, and LIPA access may be possible for WTRUs that have the same CSG ID (2165).

Figure 22:
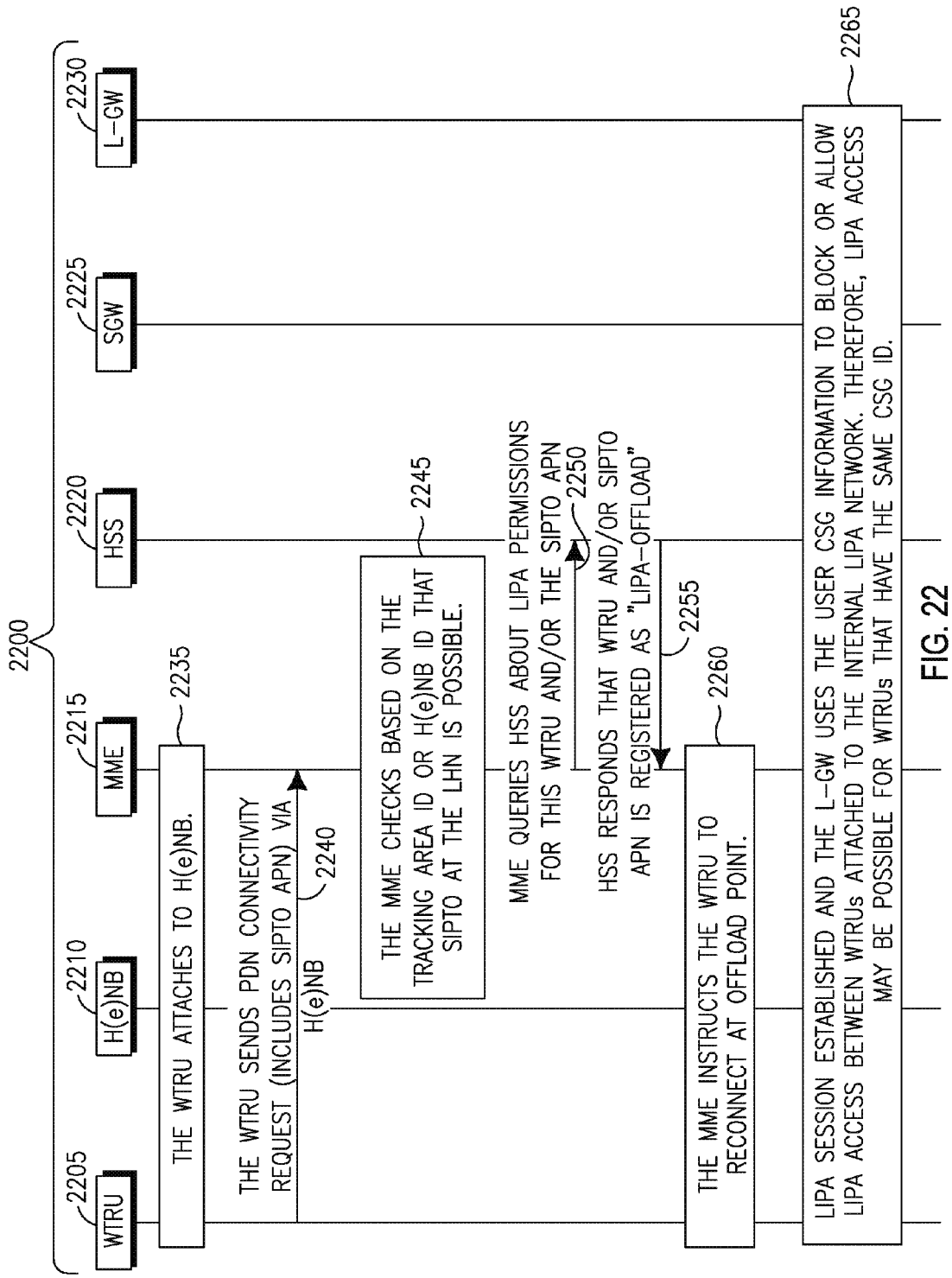
FIG. 22 is a flow diagram of a SIPTO call flow procedure for a SIPTO WTRU registered as "LIPA-offload" in an EPS ECM connected mode.

FIG. 22 is a flow diagram of a SIPTO call flow procedure for a SIPTO WTRU registered as "LIPA-offload" in an ECM connected mode in a wireless communication system 2200 including at least one WTRU 2205, an H(e)NB 2210, an MME 2215, an HSS 2220, an SGW 2225 and an L-GW 2230. The WTRU 2205 may attach to the H(e)NB 2210 (2235) and send a PDN connectivity request including a SIPTO APN via the H(e)NB 2210 to the MME 2215 (2240). The MME 2215 may check based on the tracking area ID that SIPTO at the LHN is possible (2245). The MME 2115 may query the HSS 2220 about LIPA permissions (2145) for the WTRU 2205 and/or the SIPTO APN (2250), and the HS 2220 may respond that the WTRU 2205 and/or SIPTO APN is registered as "LIPA-offload" (2255). The MME 2215 may instruct the WTRU 2105 to reconnect at an offload point (2260). A LIPA session may then be established and the L-GW 2230 may use the user CSG information to block or allow LIPA access between WTRUs attached to the internal LIPA network, and LIPA access may be possible for WTRUs that have the same CSG ID (2265).

Figure 23:
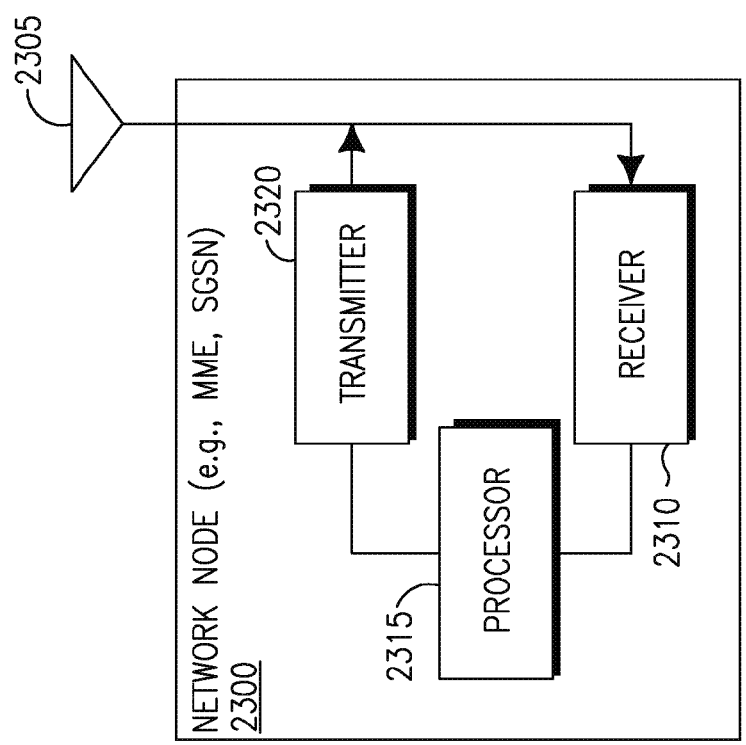
FIG. 23 is an example block diagram of a network node.

FIG. 23 is an example block diagram of a network node 2300, which may be an MME or an SGSN. The network node 2300 may include at least one antenna 2305, a receiver 2310, a processor 2315 and a transmitter 2320. The receiver 2310 may be configured to receive, via the at least one antenna 2305, a first PDN connectivity request from a WTRU to establish a first PDN connection between the WTRU and a first gateway. The processor 2315 may be configured to make a determination to perform SIPTO at a local network. The transmitter 2320 may be configured to transmit a message, via the at least one antenna 2305, instructing the WTRU to perform a PDN release and reconnection procedure, wherein the first PDN connection is released and a second PDN connection for SIPTO is established between the WTRU and a second gateway.

Figure 24:
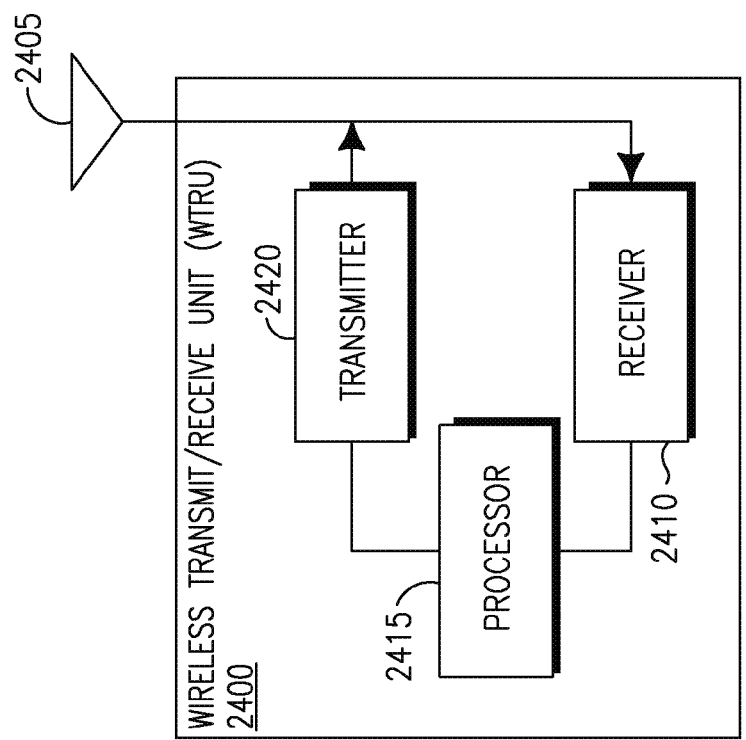
FIG. 24 is an example block diagram of a WTRU.

FIG. 24 is an example block diagram of a WTRU 2400. The WTRU 2400 may include at least one antenna 2405, a receiver 2410, a processor 2415 and a transmitter 2420. The receiver may be configured to receive, via the at least one antenna 2405, a message instructing the WTRU to perform a PDN release and reconnection procedure for a first PDN connection with a first gateway. The transmitter may be configured to transmit, via the at least one antenna 2405, a PDN connectivity request that initiates a procedure to release the first PDN connection and establish a second PDN connection for SIPTO between the WTRU and a second gateway.

Although features and elements are described above in particular combinations, one of ordinary skill in the art will appreciate that each feature or element may be used alone or in combination with any of the other features and elements. In addition, the embodiments described herein may be implemented in a computer program, software, or firmware incorporated in a computer-readable medium for execution by a computer or processor. Examples of computer-readable media include electronic signals, (transmitted over wired or wireless connections), and computer-readable storage media. Examples of computer-readable storage media include, but are not limited to, a read only memory (ROM), a random access memory (RAM), a register, a cache memory, a semiconductor memory device, a magnetic media, (e.g., an internal hard disc or a removable disc), a magneto-optical media, and an optical media such as a compact disc (CD) or a digital versatile disc (DVD). A processor in association with software may be used to implement a radio frequency transceiver for use in a WTRU, UE, terminal, base station, Node-B, eNB, HNB, HeNB, AP, RNC, wireless router or any host computer.

What is claimed is:

1. A method of a network node performing a selected Internet protocol (IP) traffic offload (SIPTO) procedure, the method comprising:
receiving a first packet data network (PDN) connectivity request from a wireless transmit/receive unit (WTRU) to establish a first PDN connection between the WTRU and a first gateway, wherein the first PDN connectivity request includes an access point name (APN); and
for the requested APN, selecting between one of activating SIPTO at a local network and activating SIPTO above radio access network (RAN),
wherein the activating SIPTO at the local network includes selecting a local packet data network gateway (L-GW) in the local network to use for the SIPTO procedure and the activating SIPTO above the radio access network (RAN) includes selecting a packet data network gateway (PGW) in a macro network to use for the SI PTO procedure.

2. The method of claim 1, further comprising:
on a condition that activating SIPTO at the local network is not selected, deactivating the first PDN connection by signalling a cause value indicating that reactivation of the first PDN connection is requested.

3. The method of claim 1, further comprising:
receiving location information from the WTRU; and
making a determination to activate SIPTO at the local network based on the location information.

4. The method of claim 3, further comprising:
instructing the WTRU to perform a PDN release and reconnection procedure;
receiving a second PDN connectivity request from the WTRU; and
initiating a procedure to release the first PDN connection and establish a second PDN connection for SIPTO between the WTRU and a second gateway in the local network.

5. The method of claim 4, wherein the network node is a mobility management entity (MME) and the second gateway is a local gateway in the local network.

6. The method of claim 4, wherein the network node is a serving general packet radio service (GPRS) support node (SGSN) and the second gateway is a local gateway in the local network.

7. The method of claim 1, wherein the WTRU checks an access network discovery and selection function (ANDSF) for IP interface selection (OPIIS) rules, identifies a local access point name (APN) that supports per flow SIPTO at the local network, and identifies IP flows that can be routed to the local APN.

8. The method of claim 7, wherein the WTRU uses IP flow mobility (IFOM) procedures to offload traffic to the local APN.

9. The method of claim 3, wherein selecting activating SIPTO at the local network is based on at least one of a closed subscriber group (CSG) identity (ID), a home evolved Node-B (HeNB) ID or a local network ID.

10. The method of claim 3, wherein the location information includes a tracking area identity or a home evolved Node-B identity.

11. The method of claim 1, further comprising:
receiving a message indicating that at least one of the WTRU or the SIPTO access point name (APN) is registered as local IP access (LIPA) offload in response to at least one query about LIPA permissions;
instructing the WTRU to reconnect at an offload point; and
establishing a LIPA session.

12. A network node comprising:
a transceiver configured to receive a first packet data network (PDN) connectivity request from a wireless transmit/receive unit (WTRU) to establish a first PDN connection between the WTRU and a first gateway, wherein the first PDN connectivity request includes an access point name (APN); and
a processor, the processor and the transceiver configured to select, for the APN, between one of activating selected Internet protocol (IP) traffic offload (SIPTO) at a local network and activating SIPTO above radio access network (RAN),
wherein the activating SIPTO at the local network includes selecting a local packet data network gateway (L-GW) in the local network to use for a SIPTO procedure and the activating SIPTO above the radio access network (RAN) includes selecting a packet data network gateway (PGW) in a macro network to use for the SIPTO procedure.

13. The network node of claim 12, wherein the processor is further configured to, on a condition that the processor does not select activating SIPTO at the local network, deactivate the first PDN connection by signalling a cause value indicating that reactivation of the first PDN connection is requested.

14. The network node of claim 12, wherein:
the transceiver is further configured to receive location information from the WTRU,
the processor is further configured to select activating SIPTO at the local network based on the location information,
the transceiver is further configured to send a message instructing the WTRU to perform a PDN release and reconnection procedure,
the transceiver is further configured to receive a second PDN connectivity request from the WTRU, and
the processor is further configured to initiate a procedure to release the first PDN connection and establish a second PDN connection for SIPTO between the WTRU and a second gateway in the local network.

\* \* \* \* \*